(12) United States Patent
Kivel et al.

(10) Patent No.: US 12,546,923 B2
(45) Date of Patent: Feb. 10, 2026

(54) OPTICAL FILM, OPTICAL STACK AND DISPLAY SYSTEM

(71) Applicant: 3M INNOVATIVE PROPERTIES COMPANY, St. Paul, MN (US)

(72) Inventors: Edward J. Kivel, Stillwater, MN (US); Adam D. Haag, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 316 days.

(21) Appl. No.: 18/284,597

(22) PCT Filed: Mar. 24, 2022

(86) PCT No.: PCT/IB2022/052714
§ 371 (c)(1),
(2) Date: Sep. 28, 2023

(87) PCT Pub. No.: WO2022/214903
PCT Pub. Date: Oct. 13, 2022

(65) Prior Publication Data
US 2024/0176055 A1     May 30, 2024

Related U.S. Application Data

(60) Provisional application No. 63/200,937, filed on Apr. 5, 2021.

(51) Int. Cl.
G02B 5/22 (2006.01)
G02B 5/20 (2006.01)
G02B 5/26 (2006.01)

(52) U.S. Cl.
CPC ............... *G02B 5/22* (2013.01); *G02B 5/208* (2013.01); *G02B 5/26* (2013.01)

(58) Field of Classification Search
None
See application file for complete search history.

(56) References Cited

U.S. PATENT DOCUMENTS

2013/0135750 A1   5/2013  Walker, Jr. et al.
2020/0033980 A1   1/2020  Lee et al.
(Continued)

FOREIGN PATENT DOCUMENTS

| CN | 107735701 A | * | 2/2018 | ............ G02C 7/107 |
| WO | 2020031140 A2 | | 2/2020 | |
| WO | 2020051874 A1 | | 3/2020 | |

OTHER PUBLICATIONS

International Search report for PCT International Application No. PCT/IB2022/052714, mailed on Jun. 29, 2022, 4 pages.

*Primary Examiner* — Phu Vu
(74) *Attorney, Agent, or Firm* — Christopher P. Tebow

(57) ABSTRACT

An optical stack includes a light control film and an optical film disposed on the light control film. The light control film includes a plurality of visible light transmitting regions separated from each other by one or more visible light absorbing regions. The optical film includes a plurality of microlayers having an F-ratio between about 0.25 to about 0.35 or about 0.65 to about 0.75. The optical film further includes a primary reflection band having a first band edge between about 600 nanometers (nm) and about 700 nm, and a secondary reflection band having a second band edge between about 350 nm and about 460 nm. The plurality of microlayers has an average optical reflectance of greater than about 80% across a FWHM of the primary reflection band for each of mutually orthogonal first and second polarization states.

10 Claims, 19 Drawing Sheets

(56) References Cited

U.S. PATENT DOCUMENTS

| | | | |
|---|---|---|---|
| 2020/0257028 A1* | 8/2020 | Haag | G02B 5/3041 |
| 2021/0294003 A1* | 9/2021 | Roehrig | G02B 5/003 |
| 2022/0052301 A1* | 2/2022 | Xu | G02B 5/3041 |

* cited by examiner

OPTICAL FILM, OPTICAL STACK AND DISPLAY SYSTEM

CROSS REFERENCE TO RELATED APPLICATIONS

This application is a national stage filing under 35 U.S.C. 371 of PCT/IB2022/052714, filed Mar. 24, 2022, which claims the benefit of U.S. Provisional Application No. 63/200,937, filed Apr. 5, 2021, the disclosures of which are incorporated by reference in their entireties herein.

TECHNICAL FIELD

The present disclosure relates generally to an optical film, and in particular, to an optical film, an optical stack including the optical film, and a display system including the optical stack.

BACKGROUND

Backlight units are used to provide light to a display panel. Backlight units typically include one or more light sources that emit light. In some cases, backlight units can emit low wavelength blue light and/or ultraviolet (UV) light that may be harmful to viewers. In some applications, especially with laptops, notebooks and other mid to smaller size displays where a display output is generally intended for a single user, it may be desirable that the backlights provide privacy to the user by blocking observation of others that are outside a typical range of viewing angles.

SUMMARY

In a first aspect, the present disclosure provides an optical stack. The optical stack includes a light control film including a plurality of visible light transmitting regions separated from each other by one or more visible light absorbing regions. The optical stack further includes an optical film disposed on the light control film. The optical film includes a plurality of microlayers having an F-ratio between about 0.25 to about 0.35, or about 0.65 to about 0.75. The optical film further includes a primary reflection band having a first band edge between about 600 nanometers (nm) and about 700 nm, and a secondary reflection band having a second band edge between about 350 nm and about 460 nm. The plurality of microlayers has an average optical reflectance of greater than about 80% across a full width at half maximum (FWHM) of the primary reflection band for each of mutually orthogonal first and second polarization states.

In a second aspect, the present disclosure provides an optical stack. The optical stack includes a light control film including a first major surface, a second major surface opposite to the first major surface, and a plurality of alternating visible light transmitting regions and visible light absorbing regions disposed between the first major surface and the second major surface. The light control film has a viewing angle of less than about 60 degrees. The optical stack further includes an optical film disposed on the first major surface of the light control film. The optical film includes a transmission band including a first band edge, a second band edge, and a full width at half maximum (FWHM) extending from a first low wavelength to a first high wavelength greater than the first low wavelength. The first low wavelength is disposed within a first wavelength range from about 420 nm to about 460 nm. The first high wavelength is disposed within a second wavelength range from about 620 nm to about 660 nm. For a substantially normally incident first light and for at least one polarization state, the optical film transmits at least about 60% of the first light for at least one first wavelength within the FWHM of the transmission band. For the substantially normally incident first light and for the at least one polarization state, the optical film reflects at least about 60% of the first light for at least one second wavelength less than the at least one first wavelength of the transmission band. For a second light incident at an oblique angle greater than about half of the viewing angle with respect to a normal to a major surface of the optical film and for the at least one polarization state, the optical film transmits at least about 60% of the second light for the at least one first wavelength. For the second light incident at the oblique angle greater than about half of the viewing angle with respect to the normal to the major surface of the optical film and for the at least one polarization state, the optical film transmits at least about 60% of the second light for the at least one second wavelength.

In a third aspect, the present disclosure provides an optical film. The optical film includes a packet including a plurality of microlayers numbering at least 50 in total. Each of the microlayers has an average thickness of less than about 350 nm. The packet includes a transmission band including a first band edge, a second band edge, and a full width at half maximum (FWHM) extending from a first low wavelength to a first high wavelength greater than the first low wavelength. The first low wavelength is disposed within a first wavelength range from about 420 nm to about 460 nm. The first high wavelength is disposed within a second wavelength range from about 620 nm to about 660 nm. For a substantially normally incident first light and for at least one polarization state, the packet transmits at least about 60% of the first light for at least one first wavelength within the FWHM of the transmission band. For the substantially normally incident first light and for the at least one polarization state, the packet reflects at least about 60% of the first light for at least one second wavelength less than the at least one first wavelength of the transmission band. For a second light incident at an oblique angle greater than about 30 degrees with respect to a normal to a major surface of the optical film and for the at least one polarization state, the packet transmits at least about 60% of the second light for the at least one first wavelength. For the second light incident at the oblique angle greater than about 30 degrees with respect to the normal to the major surface of the optical film and for the at least one polarization state, the packet transmits at least about 60% of the second light for the at least one second wavelength.

In a fourth aspect, the present disclosure provides a display system. The display system includes a display unit including an emission surface. The display unit is configured to emit a display light though the emission surface. The display system further includes an optical stack disposed on the emission surface of the display unit. The optical stack is configured to receive the display light from the display unit and transmit at least a portion of the display light as an output light toward a viewer. The optical stack includes a light control film including a first major surface, a second major surface opposite to the first major surface, and a plurality of alternating visible light transmitting regions and visible light absorbing regions disposed between the first major surface and the second major surface. The light control film has a viewing angle of less than about 60 degrees. The optical stack further includes an optical film disposed on the first major surface of the light control film. The optical film includes a transmission band including a first band edge, a second band edge, and a full width at half maximum (FWHM) extending from a first low wavelength to a first high wavelength greater than the first low wavelength. The first low wavelength is disposed within a first wavelength range from about 420 nm to about 460 nm. The first high wavelength is disposed within a second wavelength range from about 620 nm to about 660 nm. For a substantially normally incident first light and for at least one polarization state, the optical film transmits at least about 60% of the first light for at least one first wavelength within the FWHM of the transmission band. For the substantially normally incident first light and for the at least one polarization state, the optical film reflects at least about 60% of the first light for at least one second wavelength less than the at least one first wavelength of the transmission band. For a second light incident at an oblique angle greater than about half of the viewing angle with respect to a normal to a major surface of the optical film and for the at least one polarization state, the optical film transmits at least about 60% of the second light for the at least one first wavelength. For the second light incident at the oblique angle greater than about half of the viewing angle with respect to the normal to the major surface of the optical film and for the at least one polarization state, the optical film transmits at least about 60% of the second light for the at least one second wavelength.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
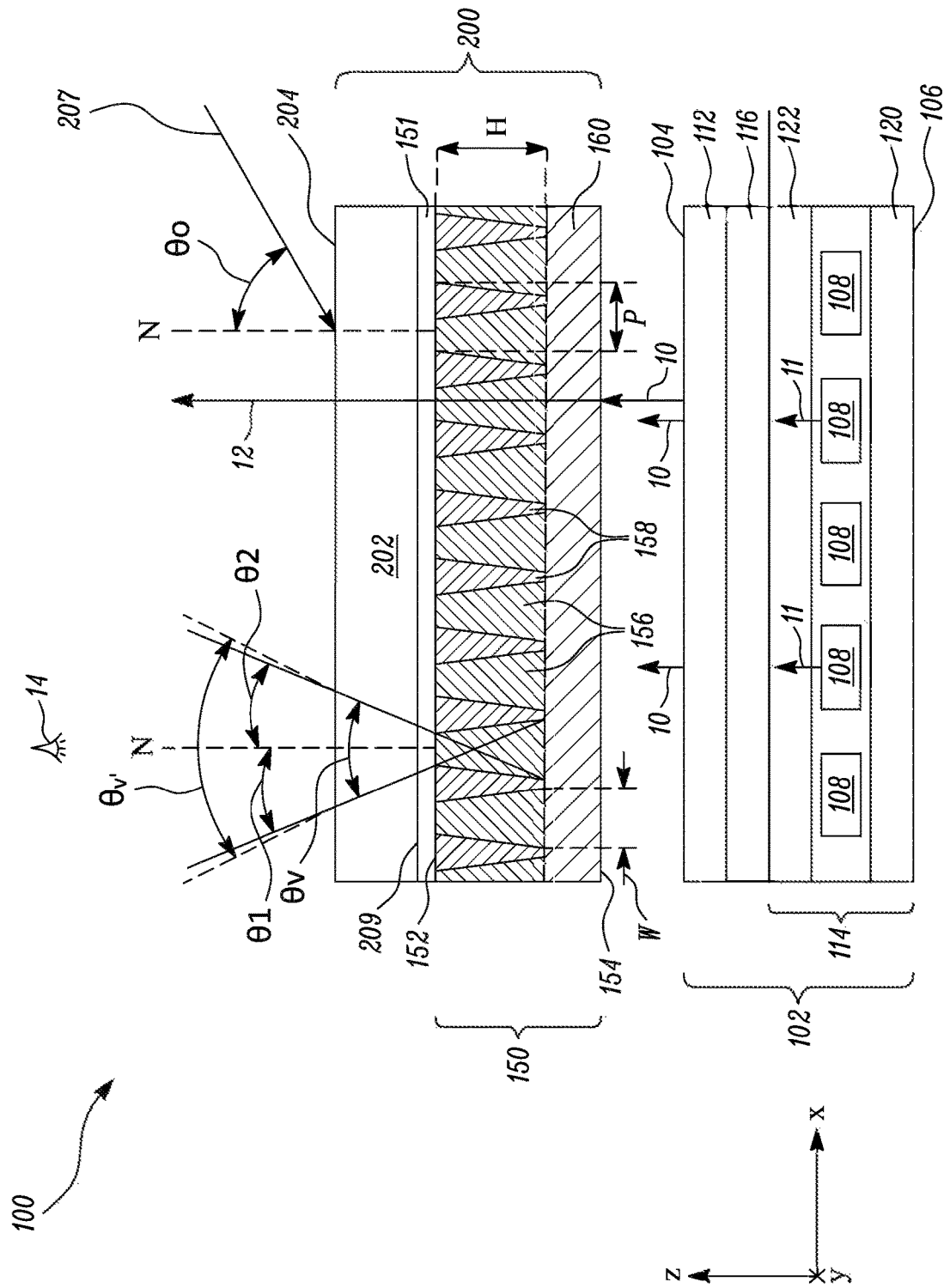
FIG. 1 is a schematic sectional view of a display system, according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

As used herein, the term "viewing angle" is defined as a range of angles over which an article is substantially transmissive. In some cases, the viewing angle is centered with respect to the normal of the plane of the article. In some other cases, the viewing angle may not be centered at the normal of the plane of the article, and may instead be off-center with respect to the normal. For example, the viewing angle of the article may be defined as a range of angles over which the transmission of the article is within 60%, within 50%, within 40%, within 20%, within 10%, or within 5% of a peak transmission.

The present disclosure relates to an optical film, an optical stack including the optical film, and a display system including the optical stack. The optical stack may be used in a backlight of electronic devices that include displays, such as computer monitors, televisions, mobile phones, personal digital assistants (PDAs), laptops, notebooks, wearable devices, and other portable devices.

Backlights for display panels can emit ultraviolet light and low wavelength blue light. Ultraviolet (UV) light and low wavelength blue light can be harmful to human eyes and can potentially cause macular degeneration. Conventional electronic displays include light absorbing dyes for blocking certain harmful wavelengths. However, such light absorbing dyes generally have a broad absorbing band. In other words, such light absorbing dyes may absorb light over a relatively long wavelength range and thereby generate an undesirable color shift.

Further, light control films (LCF) are used with a display of the backlight to provide privacy to a viewer up to a certain range of a viewing angle. LCFs typically absorb obliquely incident light outside the range of the viewing angle. Therefore, the display may appear black to an off-axis viewer which may be undesirable.

The present disclosure relates to an optical stack. The optical stack includes a light control film including a plurality of visible light transmitting regions separated from each other by one or more visible light absorbing regions. The optical stack further includes an optical film disposed on the light control film. The optical film includes a plurality of microlayers having an F-ratio between about 0.25 to about 0.35, or about 0.65 to about 0.75. The optical film further includes a primary reflection band having a first band edge between about 600 nanometers (nm) and about 700 nm, and a secondary reflection band having a second band edge between about 350 nm and about 460 nm. The plurality of microlayers has an average optical reflectance of greater than about 80% across a full width at half maximum (FWHM) of the primary reflection band for each of mutually orthogonal first and second polarization states.

The secondary reflection band may correspond to a second order harmonic band of the optical film. In some cases, an average reflectance or a reflection strength of the secondary reflection band may depend on the F-ratio of the optical film. Specifically, the F-ratio between about 0.25 to about 0.35, or about 0.65 to about 0.75 may provide a sufficient reflection strength of the secondary reflection band to substantially reflect UV light and low wavelength blue light in a wavelength range from about 350 nm to about 460 nm.

In some embodiments, the optical film further includes a transmission band including the first band edge, the second band edge, and a full width at half maximum (FWHM) extending from a first low wavelength to a first high wavelength greater than the first low wavelength. The first low wavelength is disposed within a first wavelength range from about 420 nm to about 460 nm. The first high wavelength is disposed within a second wavelength range from about 620 nm to about 660 nm. For a substantially normally incident first light and for at least one polarization state, the optical film transmits at least about 60% of the first light for at least one first wavelength within the FWHM of the transmission band. For the substantially normally incident first light and for the at least one polarization state, the optical film reflects at least about 60% of the first light for at least one second wavelength less than the at least one first wavelength of the transmission band. For a second light incident at an oblique angle greater than about half of the viewing angle with respect to a normal to a major surface of the optical film and for the at least one polarization state, the optical film transmits at least about 60% of the second light for the at least one first wavelength. For the second light incident at the oblique angle greater than about half of the viewing angle with respect to the normal to the major surface of the optical film and for the at least one polarization state, the optical film transmits at least about 60% of the second light for the at least one second wavelength.

For a substantially normal incidence and for the at least one polarization state, the optical film may have a relatively low transmittance in a UV wavelength range from about 400 nm to about 420 nm. Moreover, for substantially normal incidence and for the at least one polarization state, the optical film may have a relatively low transmittance in a wavelength range from about 350 nm to about 420 nm. For the substantially normally incident first light and for the at least one polarization state, the optical stack including the optical film may therefore have an overall low transmittance for UV light having wavelengths from about 400 nm to about 420 nm. This may safeguard a viewer from harmful effects of UV light as well as low wavelength blue light. Specifically, the optical film may substantially block UV light as well as low wavelength blue light originating from a backlight of the display system including the optical film.

Further, the second band edge of the transmission band is relatively sharp as compared to conventional films. For substantially normal incidence, the second band edge may separate the UV wavelength range (from about 400 nm to about 420 nm) from a substantial portion (from about 450 nm to about 650 nm) of a visible wavelength range, such that the optical film may substantially block UV light, while substantially transmitting at least some wavelengths of visible light. Therefore, for substantially normal incidence, the optical film may have a relatively high transmittance for green light and a portion of red light. Hence, due to the sharpness of the second band edge of the transmission band, the optical stack may substantially transmit a considerable portion of visible light through the optical film. Thus, for substantially normal incidence, the optical stack may not provide an undesirable color shift.

For an oblique incidence and for the at least one polarization state, the optical film may have an overall high transmittance in the UV wavelength range from about 400 nm to about 420 nm. Specifically, for a given wavelength (e.g., the at least one second wavelength) in the UV wavelength range and low blue wavelength range, the optical film may substantially reflect normally incident light and substantially transmit obliquely incident light. For the oblique incidence and for the at least one polarization state, the optical stack including the optical film may therefore have an overall high transmittance for UV light having wavelengths from about 400 nm to about 420 nm. Hence, for the second light incident at the oblique angle, and for the at least one polarization state, the optical film may have a low reflectance for low wavelength blue light and UV light (from about 410 nm to about 420 nm) toward an off-axis viewer located at an oblique angle with respect to the normal to the major surface of the optical film. At such oblique angles and for the at least one polarization state, the optical stack including the optical film may have an overall high transmittance for low wavelength blue ambient light and UV light. The optical stack may prevent low wavelength blue light and UV light from reaching the off-axis viewer located at oblique angles, and protect the off-axis viewer from harmful effects of low wavelength blue light and UV light.

Moreover, the light control film, having the viewing angle of less than about 60 degrees, may prevent visible wavelengths of a display light to be transmitted to an off-axis viewer located at greater than about half of the viewing angle with respect to the normal. For the second light incident at the oblique angle greater than half of the viewing angle, the optical stack may have an overall high reflectance in a wavelength range from about 550 nm to about 700 nm. The optical stack including the optical film may therefore reflect golden to red color light toward the off-axis viewer upon being irradiated with an obliquely incident ambient light, thereby blocking contents of a display including the optical stack at oblique angles greater than about half of the viewing angle. Hence, the optical stack may provide a privacy functionality to the on-axis viewer. Further, the off-axis viewer may observe colored light in a design wavelength range and not a black display, which may otherwise be undesirable.

Therefore, the optical stack including the optical film may provide a dual functionality of privacy and blocking of low wavelength blue light and UV light for an on-axis viewer. Further, the optical stack including the optical film may protect an off-axis viewer from harmful effects of low wavelength blue light and UV light, which may otherwise cause macular degeneration. The optical film may also provide reflected light in a design wavelength range to the off-axis viewer in contrast to conventional displays that typically appear black to the off-axis viewer.

Referring now to FIG. 1, a display system 100 is illustrated according to an embodiment of the present disclosure. The display system 100 defines mutually orthogonal x, y, and z-axes. The x and y-axes are in-plane axes of the display system 100, while the z-axis is a transverse axis disposed along a thickness of the display system 100. In other words, the x and y-axes are disposed along a plane of the display system 100, while the z-axis is perpendicular to the plane of the display system 100.

The display system 100 includes a display unit 102 and an optical stack 200. The display unit 102 includes an emission surface 104 and a bottom surface 106 opposite to the emission surface 104. The display unit 102 is configured to emit a display light 10 through the emission surface 104. In some embodiments, the display unit 102 emits the display light 10 through the emission surface 104 at least toward the optical stack 200. As shown in FIG. 1, in some embodiments, the display unit 102 includes a display panel 112, a backlight 114 and light management layers 116 disposed between the display panel 112 and the backlight 114.

In some embodiments, the display panel 112 includes an organic light emitting diode (OLED) display panel. In some other embodiments, the display panel 112 may include a liquid crystal display (LCD) panel.

In the illustrated embodiment of FIG. 1, the backlight 114 of the display unit 102 includes at least one illumination source 108 configured to emit an illumination light 11. In some embodiments, the at least one illumination source 108 is a visible light source. In some embodiments, the at least one illumination source 108 may include at least one of filament or arc lamps, light emitting diodes (LEDs), linear cold cathode fluorescent tubes, non-linear cold cathode fluorescent tubes, flat fluorescent panels, or external electrode fluorescent lamps. Further, in some embodiments, the illumination light 11 emitted by the at least one illumination source 108 is generally unpolarized. However, in some cases, the illumination light 11 may be at least partially polarized light. For the purpose of explanation, the illumination light 11 may be treated as light having an unknown or arbitrary polarization state or distribution of polarization states. In the illustrated embodiment, the display unit 102 includes multiple illumination sources 108 disposed in a direct-lit configuration. However, in some other cases, the display unit 102 may additionally or alternatively include one or more illumination sources in an edge-lit configuration.

The backlight 114 further includes a reflector 120 and diffusing layers 122. The at least one illumination source 108 is disposed between the reflector 120 and the diffusing layers 122. The diffusing layers 122 may include one or more diffuser layers, a light guide, and so forth.

The light management layers 116 may include one or more of light collimating layers, reflective polarizers, absorbing polarizers, diffuser layers, light converting layers, etc. between the display panel 112 and the backlight 114. The display unit 102 may, in total, be of any suitable thickness based on desired application attributes.

The illumination light 11 emitted by the at least one illumination source 108 may undergo various optical processes as it passes through the diffusing layers 122 and the light management layers 116, such as absorption, scattering, reflection, polarization, refraction, and other interactions. The display panel 112 may receive processed light from the light management layers 116 and emits the display light 10 through the emission surface 104 of the display unit 102.

In some embodiments, the display light 10 emitted by the display panel 112 may be polarized light. In some embodiments, the display light 10 may be polarized along a first direction, e.g., the x-axis. In some embodiments, the display light 10 may be s-polarized light. In some other embodiments, the display light 10 may be p-polarized light. In some embodiments, the display light 10 is generally unpolarized or at least partially polarized light. For example, in some cases, the display light 10 may be light having an unknown or arbitrary polarization state or distribution of polarization states.

The display unit 102 shown in FIG. 1 is exemplary in nature, and the display unit 102 may have alternative configurations within the scope of the present disclosure.

With continued reference to FIG. 1, the optical stack 200 is disposed on the emission surface 104 of the display unit 102. The optical stack 200 is configured to receive the display light 10 from the display unit 102 and transmit at least a portion of the display light 10 as an output light 12 toward a viewer 14. In some embodiments, the viewer 14 can be interchangeably referred to herein as an on-axis viewer 14. In some embodiments, the display unit 102 and the optical stack 200 are disposed adjacent to each other along the z-axis. In some embodiments, the display unit 102 and the optical stack 200 may be bonded together, for example, by means of an optical adhesive, epoxy, lamination, or any other suitable method of attachment.

The optical stack 200 includes a light control film 150 and an optical film 202 disposed on the light control film 150. The light control film 150 includes a first major surface 152, a second major surface 154 opposite to the first major surface 152, and a plurality of alternating visible light transmitting regions 156 and visible light absorbing regions 158 disposed between the first major surface 152 and the second major surface 154. Therefore, in the illustrated embodiment of FIG. 1, the plurality of visible light transmitting regions 156 are separated from each other by one or more visible light absorbing regions 158. In the illustrated embodiment of FIG. 1, the optical film 202 is disposed on the first major surface 152 of the light control film 150. Specifically, the light control film 150 and the optical film 202 are disposed adjacent to each other along the z-axis of the display system 100. Further, the light control film 150 and the optical film 202 is bonded to each other by an adhesive layer 151. In some embodiments, the adhesive layer 151 may include an optically clear adhesive, such as a UV-curable acrylate adhesive, a transfer adhesive, and the like. In some other embodiments, the optical film 202 may be bonded to the light control film 150 with epoxy, lamination, or any other suitable method of attachment.

As shown in FIG. 1, the optical film 202 includes a first major surface 204 and a second major surface 209 opposite to the first major surface 204. The light control film 150 is disposed adjacent to the second major surface 209 of the optical film 202. The first major surface 204 may face the viewer 14. The first major surface 204 may be interchangeably referred to as "the major surface 204" of the optical film 202.

In some embodiments, the light control film 150 and the optical film 202 are substantially co-extensive with each other, or of same in-plane dimensions (i.e., length and width). Specifically, the light control film 150 and the optical film 202 may be substantially co-extensive with each other in the x-y plane.

Referring to the light control film 150 illustrated in FIG. 1, an interface 162 is disposed between each visible light transmitting region 156 and an adjacent visible light absorbing region 158. The second major surface 154 of the light control film 150 is proximal to the display unit 102. In some embodiments, the second major surface 154 of the light control film 150 is disposed on the emission surface 104 of the display unit 102. However, in some other embodiments, the display system 100 may include one or more intervening layers (not shown) between the light control film 150 and the display unit 102. The alternating visible light transmitting regions 156 and visible light absorbing regions 158 extend across a width of the light control film 150. The visible light transmitting regions 156 have a base width W disposed apart from each other by a pitch P along the x-axis. Each of the alternating visible light transmitting regions 156 and visible light absorbing regions 158 has a height H along the z-axis. The alternating visible light transmitting regions 156 and visible light absorbing regions 158 are built upon a base substrate 160, which is a further component of the light control film 150. In some embodiments, the base substrate 160 may be formed of polyethylene terephthalate (PET), polycarbonate (PC), acrylic (PMMA), glass, or other light-transmissive (e.g., film) material. A particular polycarbonate material may be selected so as to provide a matte finish or a glossy finish to the base substrate 160.

In some embodiments, an index of refraction r1 of the visible light transmitting regions 156 and an index of refraction r2 of the visible light absorbing regions 158 are chosen such that a magnitude of a difference between the indices of refraction r1, r2 is greater than or equal to 0.005, i.e., |r2−r1|≥0.005.

In the illustrated embodiment of FIG. 1, the light control film 150 has a viewing angle θv of less than about 60 degrees. The viewing angle θv may correspond to a polar viewing angle of the light control film 150. The viewing angle θv may be defined with respect to a normal N to the major surface 204 of the optical film 202. In some embodiments, the viewing angle θv is less than about 55 degrees, less than about 50 degrees, less than about 40 degrees, less than about 30 degrees, or less than about 20 degrees. Generally, the viewing angle θv is selected such that an adequate amount of light can pass through the light control film 150 and the optical film 202. A magnitude of the viewing angle θv is defined by shape and spacing of the interface 162, the visible light transmitting regions 156, and the visible light absorbing regions 158. For example, the magnitude of the viewing angle θv may depend on various geometric parameters of the light control film 150, such as the pitch P, the height H, the base width W, and so forth.

In some embodiments, the viewing angle θv is equal to sum of a first polar viewing half angle θ1 and a second polar viewing half angle θ2, each of which are measured with respect to the normal N to the major surface 204 of the optical film 202. In some embodiments, the viewing angle θv may be symmetric, and therefore, the first polar viewing half angle θ1 is equal to the second polar viewing half angle θ2. In some other embodiments, the viewing angle θv may be asymmetric, and therefore, the first polar viewing half angle θ1 is not equal to the second polar viewing half angle θ2.

The optical stack 200 further defines an effective viewing angle θv'. The effective viewing angle θv' may be generally different from the viewing angle θv. In some cases, the effective viewing angle θv' is within 5%, within 10%, within 20%, within 30%, within 40%, or within 50% of the viewing angle θv. The effective viewing angle θv' may correspond to a viewing angle perceived by the viewer 14. The effective viewing angle θv' may be different from the viewing angle θv of the light control film 150 due to interaction of light within various intermediate layers (e.g., the optical film 202, the adhesive layer 151, etc.) before reaching the viewer 14. In some cases, the effective viewing angle θv' may be greater than the viewing angle θv of the light control film 150. In some cases, the effective viewing angle θv' can be determined by applying Snell's law to the viewing angle θv, using indices of refraction of the optical film 202, the visible light transmitting regions 156, the base substrate 160, a material that the optical stack 200 is immersed in (typically air), and the adhesive layer 151 between the light control film 150 and the optical film 202.

Figure 2:
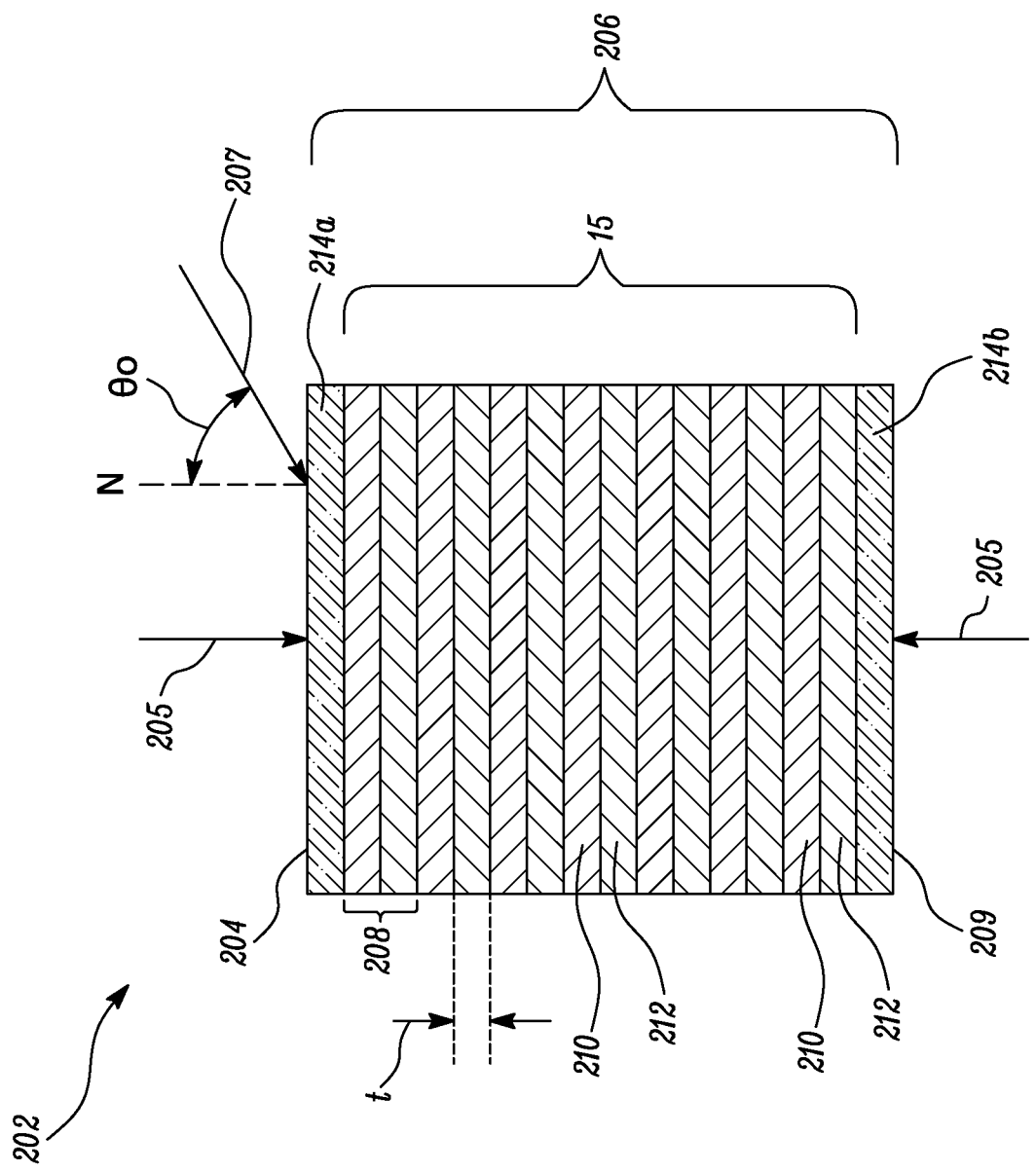
FIG. 2 is a detailed schematic sectional view of an optical film of the display system of FIG. 1, according to an embodiment of the present disclosure.

FIG. 2 illustrates a schematic sectional view of the optical film 202, according to an embodiment of the present disclosure. Referring to FIG. 2, the optical film 202 includes a plurality of microlayers 15. The plurality of microlayers 15 includes a plurality of alternating first and second polymeric layers 210, 212 numbering at least 50 in total. In some embodiments, the optical film 202 includes a packet 206 including the plurality of microlayers 15 numbering at least 50 in total. In some embodiments, the alternating first and second polymeric layers 210, 212 number at least 50 in total. In some embodiments, the first polymeric layers 210 and the second polymeric layers 212 number at least 100 in total, at least 150 in total, at least 200 in total, or at least 250 in total.

In some embodiments, the packet 206 further includes opposing outermost polymeric layers 214a, 214b. In some embodiments, the alternating first and second polymeric layers 210, 212 are disposed between the opposing outermost polymeric layers 214a, 214b. The first polymeric layers 210, the second polymeric layers 212, and the opposing outermost polymeric layers 214a, 214b are arranged along a thickness (i.e., the z-axis) of the optical film 202. At least one of the opposing outermost polymeric layers 214a, 214b may act as a protective layer of the packet 206 of the optical film 202. For example, the opposing outermost polymeric layers 214a, 214b may act as protective boundary layers (PBL) of the packet 206. In some embodiments, the optical film 202 may include two or more packets 206.

In some embodiments, the plurality of microlayers 15 and the opposing outermost polymeric layers 214a, 214b may be substantially co-extensive with each other, or of comparable in-plane dimensions (i.e., length and width). Specifically, the plurality of microlayers 15 and the opposing outermost polymeric layers 214a, 214b may be substantially co-extensive with each other in the x-y plane. In the illustrated embodiment of FIG. 2, the plurality of microlayers 15 and the opposing outermost polymeric layers 214a, 214b are disposed adjacent to each other along the z-axis of the optical film 202.

Further, a normal (shown in FIG. 2) to the x-y plane of the optical film 202 corresponds to the normal N (shown in FIG. 1) to the major surface 204 of the optical film 202.

In some embodiments, each first polymeric layer 210 includes a copolymer of polymethyl methacrylate (coPMMA). In some embodiments, each first polymeric layer 210 may include a low index optical layer (LIO) of coPMMA, available, for example, from Plaskolite, Columbus, OH, under the tradename OPTIX and has a Tg of about 80° C. In some embodiments, each second polymeric layer 212 includes a polyester or a polyethylene. In some embodiments, each second polymeric layer 212 may include a high index optical layer (HIO) of polyethylene terephthalate (PET) homopolymer (100 mol % terephthalic acid with 100 mol % ethylene glycol) having a glass transition temperature (Tg) from about 81 degrees Celsius (° C.) to about 83° C. In some embodiments, each second polymeric layer 212 may include a HIO layer of polyethylene naphthalate (PEN).

In some embodiments, each first polymeric layer 210 includes a LIO layer of PMMA and each second polymeric layer 212 includes a HIO layer of PEN. In some other embodiments, each first polymeric layer 210 includes a LIO layer of coPMMA and each second polymeric layer 212 includes a HIO layer of PET. In some embodiments, each first polymeric layer 210 includes a LIO layer of PMMA blended with polyvinylidene difluoride (PVDF) and each second polymeric layer 212 includes a HIO layer of PET.

In some embodiments, each of the first and second polymeric layers 210, 212 has an average thickness t of less than about 350 nm. In some embodiments, each of the microlayers 15 has an average thickness t of less than about 350 nm. Specifically, each of the first and second polymeric layers 210, 212 defines the average thickness t along the z-axis. The term "average thickness", as used herein, refers to an average thickness across a plane (i.e., the x-y plane) of a layer. In the illustrated embodiment of FIG. 2, the average thickness t is measured across the x-y plane and along the z-axis of the optical film 202. In some embodiments, each of the first and second polymeric layers 210, 212 has the average thickness t of less than about 300 nm, less than about 250 nm, less than about 200 nm, less than about 150 nm, less than about 100 nm, or less than about 80 nm. In some embodiments, the average thickness t is at least about 50 nm.

With reference to FIG. 2, the packet 206 includes a plurality of optical repeat units 208. Each optical repeat unit 208 includes two adjacent first and second polymeric layers 210, 212.

Figure 3:
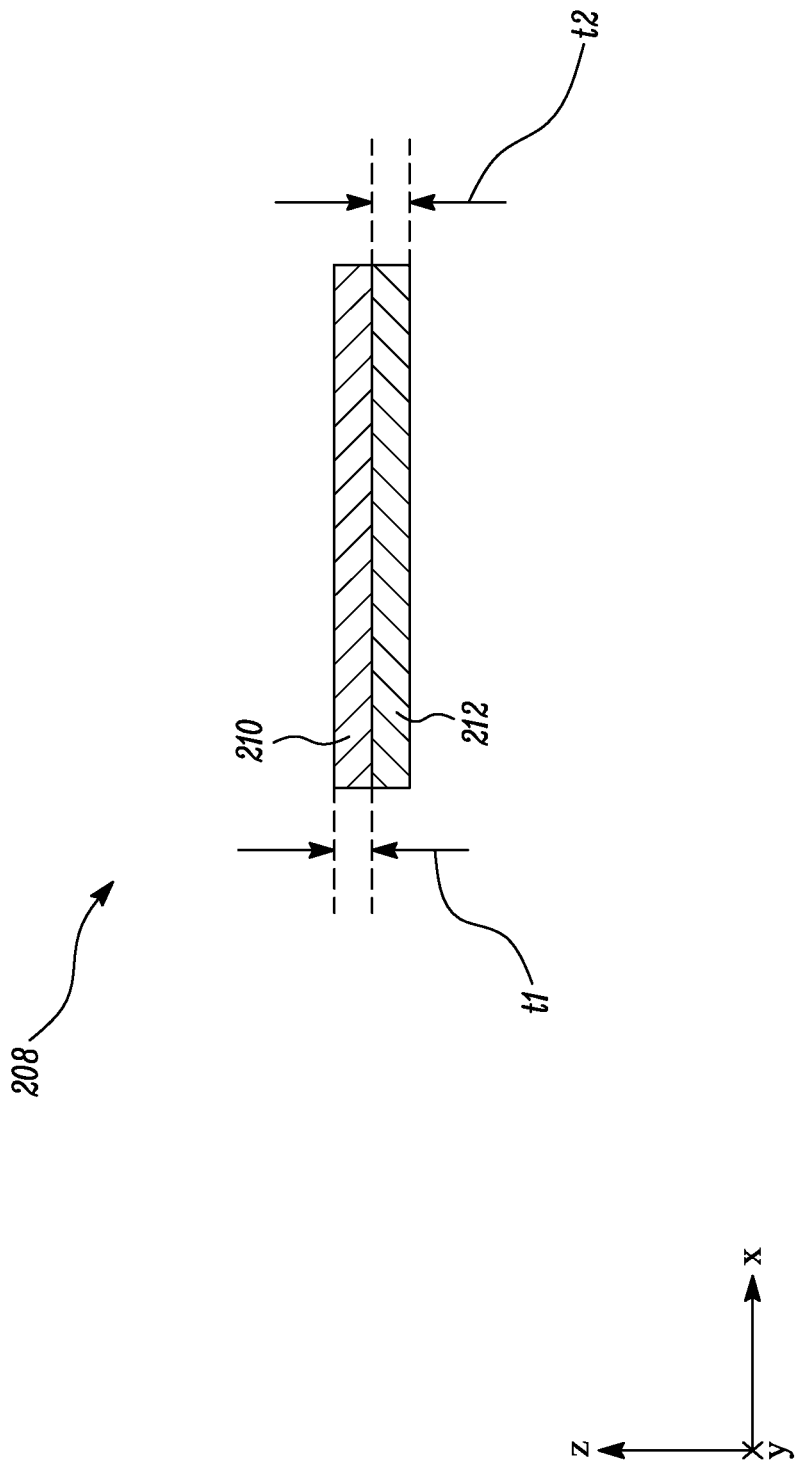
FIG. 3 is a schematic sectional view of an optical repeat unit of the optical film of FIG. 2, according to an embodiment of the present disclosure.

FIG. 3 illustrates the optical repeat unit 208, according to an embodiment of the present disclosure. In some embodiments, in the optical repeat unit 208, the first polymeric layer 210 has a thickness t1 and the second polymeric layer 212 has a thickness t2 different from the thickness t1. The thickness t1 may correspond to an average thickness of the first polymeric layer 210. Similarly, the thickness t2 may correspond to an average thickness of the second polymeric layer 212. Generally, a reflective power of an optical repeat unit may depend upon an F-ratio of the optical repeat unit. Further, for a multilayer optical stack, an F-ratio is a ratio of an optical thickness of a first layer to a sum of the optical thickness of the first layer and an optical thickness of a second layer, where an index of refraction of the first layer is greater than an index of refraction of the second layer. The optical thickness of a body refers to its physical thickness multiplied by its refractive index. Therefore, an F-ratio for the optical repeat unit 208 is the ratio of an optical thickness of the second polymeric layer 212 to a sum of an optical thickness of the first polymeric layer 210 and the optical thickness of the second polymeric layer 212, where an index of refraction of the second polymeric layer 212 is higher than an index of refraction of the first polymeric layer 210. The F-ratio of the optical repeat unit 208 is given by:

$$F\text{-ratio}=(n2*t2)/(n1*t1+n2*t2)$$

where, n1 is index of refraction of the first polymeric layer 210;

n2 is index of refraction of the second polymeric layer 212;

t1 is thickness of the first polymeric layer 210; and t2 is thickness of the second polymeric layer 212.

In some embodiments, the F-ratio is constant throughout all the optical repeat units 208 of the optical film 202. However, in some embodiments, the F-ratio varies across the various optical repeat units 208.

In some embodiments, the index of refraction n1 of the first polymeric layers 210 is relatively less with respect to the index of refraction n2 of the second polymeric layers 212. In case, n2>n1 and t2≥t1, then F-ratio>0.5. An F-ratio of 0.5 indicates that n1*t1=n2*t2. In general, deviation from an F-ratio of 0.5 results in a lesser degree of reflectivity. In case, n1*t1>n2*t2, then F-ratio<0.5.

In some embodiments, each first polymeric layer 210 and an adjoining second polymeric layer 212 has an F-ratio greater than or equal to 0.6. In other words, each optical repeat unit 208 has an F-ratio greater than or equal to 0.6. In some embodiments, each first polymeric layer 210 and an adjoining second polymeric layer 212 has an F-ratio less than or equal to 0.4. In other words, each optical repeat unit 208 has an F-ratio less than or equal to 0.4.

In some embodiments, for a constant F-ratio across all the optical repeat units 208 of the optical film 202, an F-ratio of each first polymeric layer 210 and an adjoining second polymeric layer 212 can be interchangeably referred to as "F-ratio of the plurality of microlayers 15". Further, in some embodiments, the plurality of microlayers 15 has an F-ratio between about 0.25 to about 0.35, or about 0.65 to about 0.75. In some embodiments, the plurality of microlayers 15 has an F-ratio greater than or equal to 0.65. In some embodiments, the plurality of microlayers 15 has an F-ratio less than or equal to 0.35.

In general, the reflective and transmissive power of the optical film 202 may depend upon a layer thickness gradient of the optical film 202. The layer thickness gradient can be defined as a ratio of a maximum average thickness to a minimum average thickness of the plurality of first polymeric layers 210. In some embodiments, the ratio of the maximum average thickness to the minimum average thickness of the plurality of first polymeric layers 210 is from about 1.2 to about 1.8. In other words, the layer thickness gradient across a thickness (i.e., the z-axis) of the optical film 202 is from about 1.2 to about 1.8. In some embodiments, the ratio of the maximum average thickness to the minimum average thickness of the plurality of first polymeric layers 210 is about 1.25.

Referring again to FIG. 2, the optical film 202 is irradiated with a substantially normally incident first light 205 and a second light 207 (also shown in FIG. 1) incident at an oblique angle θo greater than about half of the viewing angle θv (shown in FIG. 1) with respect to the normal N to the major surface 204 of the optical film 202. Therefore, θo>θv/2. In some embodiments, the oblique angle θo may be at least about 35 degrees, at least about 40 degrees, at least about 45 degrees, at least about 50 degrees, at least about 60 degrees, at least about 70 degrees, or at least about 80 degrees. In some embodiments, the oblique angle θo is in a range from about 35 degrees to about 80 degrees.

In some embodiments, the substantially normally incident first light 205 can be interchangeably referred to as a substantially normally incident light 205. The first light 205 may be incident on any one of the first major surface 204 or the second major surface 209 of the optical film 202. In some cases, the first light 205 may correspond the display light 10 (shown in FIG. 1).

In some embodiments, each of the first and second lights 205, 207 may be unpolarized or at least partially polarized light. For example, in some cases, each of the first and second lights 205, 207 may be light having an unknown or arbitrary polarization state or distribution of polarization states. In some embodiments, each of the first and second lights 205, 207 may be polarized light having a first polarization state or an orthogonal second polarization state. In some embodiments, the first polarization state is a p-polarization state, and the second polarization state is a s-polarization state. In some other embodiments, the first polarization state is a s-polarization state, and the second polarization state is a p-polarization state. The first polarization state is generally along the x-axis, while the second polarization state is generally along the y-axis.

In some embodiments, the optical film 202 is a partial mirror that is not sensitive to polarization of incident light. In some embodiments, the optical film 202 may be polarization sensitive and have different optical characteristics for the first and second polarization states.

Figure 4A:
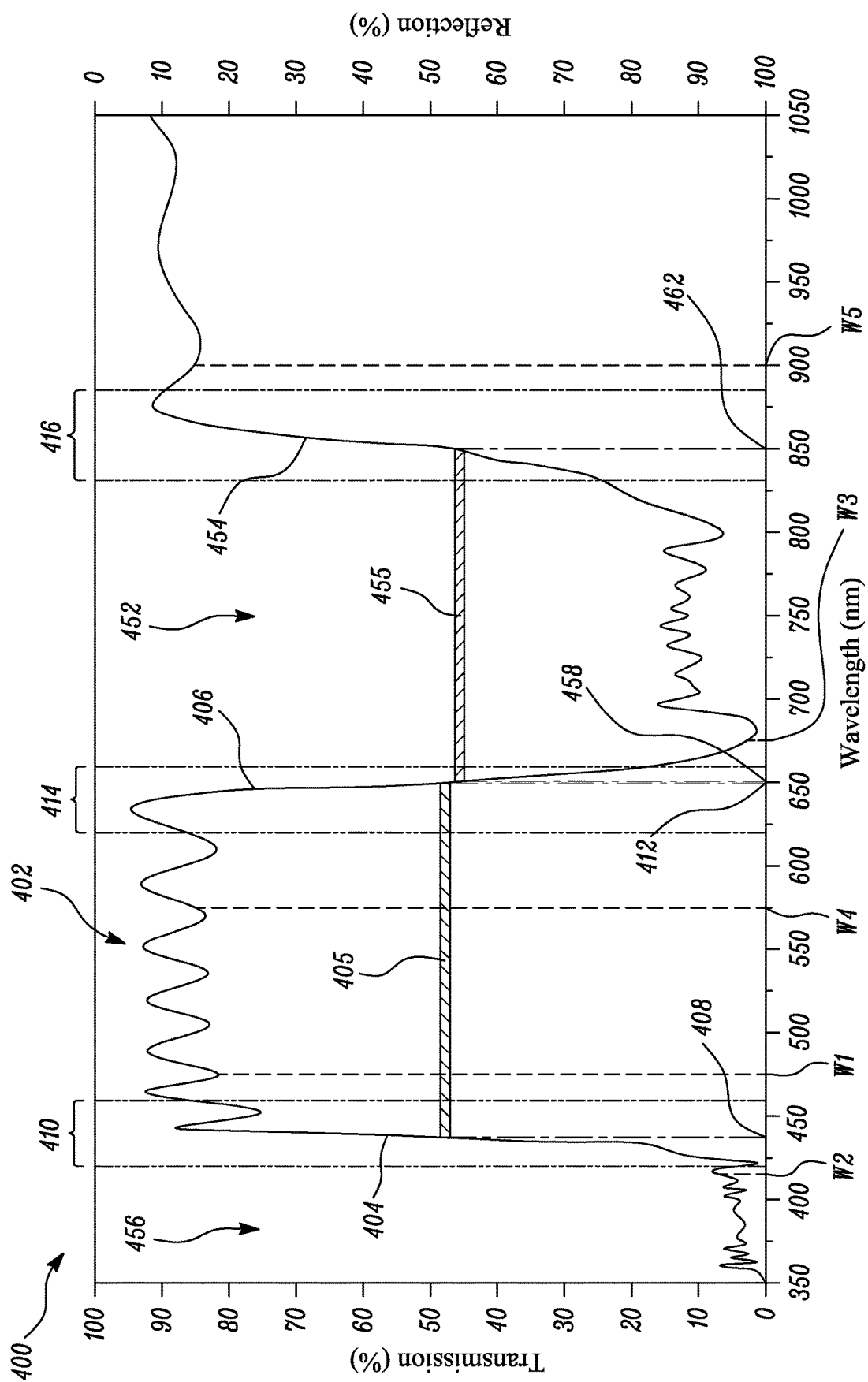
FIG. 4A is a graph illustrating transmission versus wavelength of the optical film of FIG. 2, for a substantially normal incidence, according to an embodiment of the present disclosure.

FIG. 4A illustrates a graph 400 depicting transmission versus wavelength of the optical film 202 (shown in FIGS. 1 and 2), for substantially normal incidence, according to an embodiment of the present disclosure. Specifically, the graph 400 depicts transmission versus wavelength of the optical film 202 for the substantially incident first light 205 (shown in FIG. 2). Wavelength is expressed in nanometers (nm) in the abscissa. Transmission is expressed as a transmission percentage in the left ordinate. Reflection is expressed as a reflection percentage in the right ordinate. The reflection percentage is complementary to the transmission percentage, i.e., reflection percentage=(100−transmission percentage).

Further, in some embodiments, a configuration of the optical film 202 corresponding to FIG. 4A includes the first and second polymeric layers 210, 212 numbering 224 in total, with an F-ratio of about 0.72. Moreover, the first and second polymeric layers 210, 212 include PMMA and PET, respectively. In other words, the configuration of the optical film 202 corresponding to FIG. 4A includes a 224-layer PMMA/PET multilayer optical film having an F-ratio of about 0.72.

Referring to FIGS. 2 and 4A, in some embodiments, optical characteristics of the optical film 202 is same as optical characteristics of the packet 206. Further, in some embodiments, the optical characteristics of the optical film 202 is same as optical characteristics of the plurality of microlayers 15.

With continued reference to FIGS. 2 and 4A, as shown in the graph 400, the optical film 202 includes a primary reflection band 452 having a first band edge 406 between about 600 nm and about 700 nm. The optical film 202 further includes a secondary reflection band 456 having a second band edge 404 between about 350 nm and about 460 nm. In some embodiments, the primary reflection band 452 can be interchangeably referred to as a reflection band 452.

For the substantially normally incident first light 205, the optical film 202 further includes a transmission band 402 between the primary and secondary reflection bands 452, 456. Therefore, in some embodiments, the reflection band 452 is adjacent to the transmission band 402. In some embodiments, the transmission band 402 includes the first band edge 406, the second band edge 404, and a full width at half maximum (FWHM) 405 extending from a first low wavelength 408 to a first high wavelength 412 greater than the first low wavelength 408. In some embodiments, the first low wavelength 408 is disposed within a first wavelength range 410 from about 420 nm to about 460 nm. In some embodiments, the first high wavelength 412 is disposed within a second wavelength range 414 from about 620 nm to about 660 nm. In some embodiments, the FWHM 405 of the transmission band 402 has a transmission bandwidth of at least about 150 nm. In some embodiments, the FWHM 405 of the transmission band 402 has the transmission bandwidth of at least about 160 nm, at least about 170 nm, or at least about 180 nm.

In general, a transmission bandwidth of the FWHM 405 of the transmission band 402 of the optical film 202 corresponding to F-ratio equal to "0.5+x" is relatively lower than a transmission bandwidth of the FWHM 405 of the transmission band 402 of the optical film 202 corresponding to F-ratio equal to "0.5−x", where x<0.5. Such a variation in the transmission bandwidth of the FWHM 405 of the transmission band 402, for different values of F-ratio, is caused due to dispersion. Further, the optical film 202 having an F-ratio of "0.5+x" and a relatively greater amount of PET may cause a higher amount of dispersion.

In some embodiments, the primary reflection band 452 further includes a third band edge 454 between about 800 nm and about 900 nm. In some embodiments, the primary reflection band 452 includes the first band edge 406, the third band edge 454, and a FWHM 455 extending from a second low wavelength 458 to a second high wavelength 462 greater than the second low wavelength 458. Therefore, the FWHM 455 of the primary reflection band 452 extends from the second low wavelength 458 to the second high wavelength 462 greater than the second low wavelength 458. In some embodiments, the second low wavelength 458 is disposed within the second wavelength range 414 from about 620 nm to about 660 nm. In some embodiments, the second high wavelength 462 is disposed within a third wavelength range 416 from about 830 nm to about 880 nm. In some embodiments, the FWHM 455 of the primary reflection band 452 has a reflection bandwidth of at least about 150 nm. In some embodiments, the FWHM 455 of the primary reflection band 452 has the reflection bandwidth of at least about 160 nm, at least about 170 nm, at least about 180 nm, or at least about 190 nm.

Figure 4B:
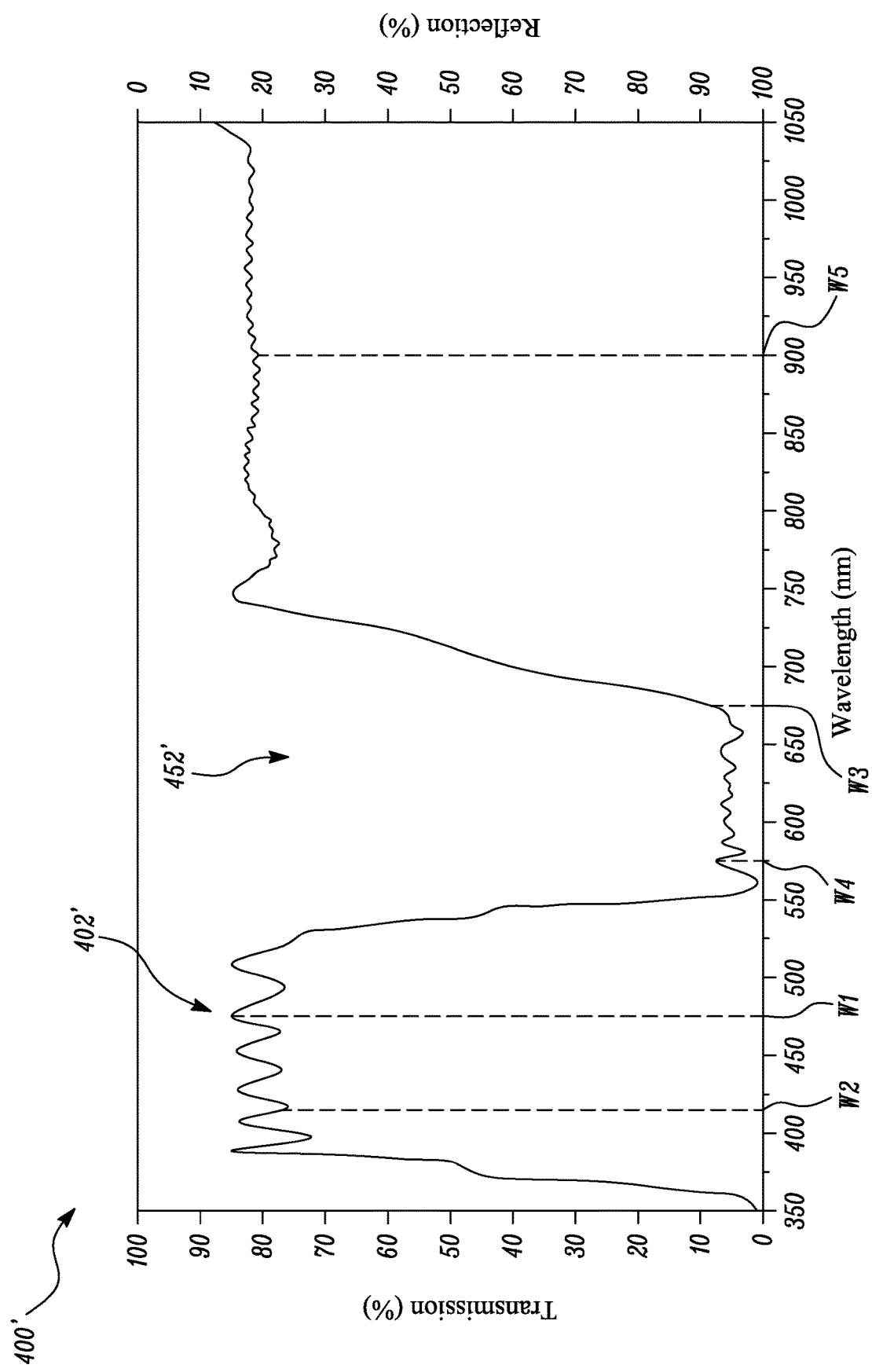
FIG. 4B is a graph illustrating transmission versus wavelength of the optical film having a similar configuration as that of the optical film corresponding to FIG. 4A, for an oblique incidence, according to an embodiment of the present disclosure.

FIG. 4B illustrates a graph 400' depicting transmission versus wavelength of the optical film 202 (shown in FIGS. 1 and 2), for oblique incidence, according to an embodiment of the present disclosure. Specifically, the graph 400' depicts transmission versus wavelength of the optical film 202 for the second light 207 (shown in FIGS. 1 and 2) incident at the oblique angle θo with respect to the normal N. Wavelength is expressed in nanometers (nm) in the abscissa. Transmission is expressed as a transmission percentage in the left ordinate. Reflection is expressed as reflection percentage in the right ordinate. The reflection percentage is complementary to the transmission percentage, i.e., reflection percentage=(100−transmission percentage).

A configuration of the optical film 202 corresponding to FIG. 4B is same as the configuration of the optical film 202 corresponding to FIG. 4A. Referring to FIGS. 2 and 4B, in some embodiments, the oblique angle θo is about 60 degrees with respect to the normal N. However, it should be noted that the oblique angle θo is greater than half of the viewing angle θv (shown in FIG. 1).

As shown in FIG. 4B, the transmission versus wavelength of the optical film 202 for oblique incidence includes a shifted transmission band 402' and a shifted reflection band 452'. Referring to FIGS. 2, 4A and 4B, the transmission and primary reflection bands 402, 452 (shown in FIG. 4A) shift toward a blue end of visible spectrum to the shifted transmission and reflection bands 402', 452' (shown in FIG. 4B), respectively, when an incidence angle of an incident light is changed from substantially normal (i.e., the first light 205) to oblique (i.e., the second light 207).

Referring to FIGS. 2 and 4A, in some embodiments, for the substantially normally incident first light 205 and for at least one polarization state, the optical film 202 transmits at least about 60% of the first light 205 for at least one first wavelength W1 within the FWHM 405 of the transmission band 402. In some embodiments, for the substantially normally incident first light 205 and for the at least one polarization state, the optical film 202 transmits at least about 70%, at least about 75%, or at least about 80% of the first light 205 for the at least one first wavelength W1 within the FWHM 405 of the transmission band 402. For example, as shown in FIG. 4A, the at least one first wavelength W1 is about 475 nm. In some embodiments, the at least one polarization state includes the first polarization state and the orthogonal second polarization state. In some embodiments, the at least one polarization state includes the first polarization state or the orthogonal second polarization state. In some embodiments, the plurality of microlayers 15 has an average optical transmittance of about 80% across the FWHM 405 of the transmission band 402 for each of the first and second polarization states.

Referring now to FIGS. 2 and 4B, in some embodiments, for the second light 207 incident at the oblique angle θo greater than about half of the viewing angle θv with respect to the normal N to the major surface 204 of the optical film 202 and for the at least one polarization state, the optical film 202 transmits at least about 60% of the second light 207 for the at least one first wavelength W1. In some embodiments, for the second light 207 incident at the oblique angle θo greater than about 30 degrees with respect to the normal N to the major surface 204 of the optical film 202 and for the at least one polarization state, the packet 206 transmits at least about 60% of the second light 207 for the at least one first wavelength W1. In some embodiments, for the second light 207 incident at the oblique angle θo with respect to the normal N and for the at least one polarization state, the optical film 202 transmits at least about 70%, at least about 75%, or at least about 80% of the second light 207 for the at least one first wavelength W1. In some embodiments, for the second light 207 incident at the oblique angle θo greater than about 30 degrees with respect to the normal N and for the at least one polarization state, the packet 206 transmits at least about 70%, at least about 75%, or at least about 80% of the second light 207 for the at least one first wavelength W1. In some embodiments, the at least one polarization state includes the first polarization state and the orthogonal second polarization state. In some embodiments, the at least one polarization state includes the first polarization state or the orthogonal second polarization state.

Figure 4C:
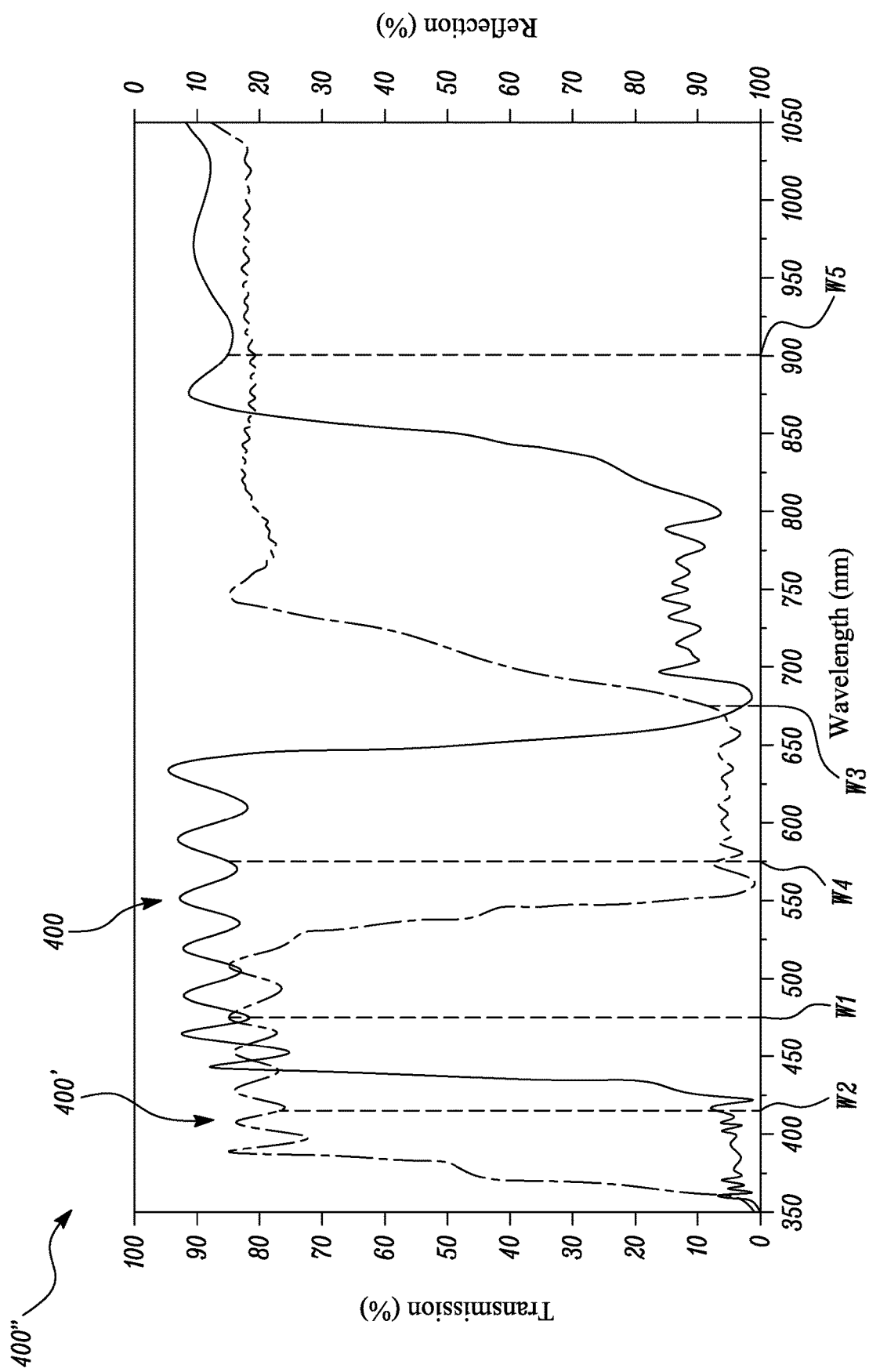
FIG. 4C is a graph illustrating transmission versus wavelength of the graphs of FIGS. 4A and 4B, according to an embodiment of the present disclosure.

FIG. 4C shows a graph 400" illustrating transmission versus wavelength of both of the graphs 400, 400'. Referring to FIGS. 2 and 4C, in some embodiments, for the at least one polarization state and for the at least one first wavelength W1, the optical film 202 transmits at least about 60% of each of the first and second lights 205, 207. In some embodiments, the at least one first wavelength W1 is disposed in a wavelength range from about 440 nm to about 530 nm. In some embodiments, for the substantially normally incident first light 205 and for the at least one polarization state, the optical film 202 transmits at least about 90% of the first light 205 for the at least one first wavelength W1 in the wavelength range from about 440 nm to about 530 nm.

Referring to FIG. 4A, in some embodiments, the at least one first wavelength W1 is greater than the first low wavelength 408 by at most about 70% of the FWHM 405 of the transmission band 402. In other words, a difference between the at least one first wavelength W1 and the first low wavelength 408 is at most about 70% of the transmission bandwidth of the FWHM 405 of the transmission band 402. In some embodiments, the at least one first wavelength W1 may be greater than the first low wavelength 408 by at most about 60%, at most about 50%, or at most about 45% of the FWHM 405 of the transmission band 402.

Referring to FIGS. 2 and 4A, in some embodiments, for the substantially normally incident first light 205 and for the at least one polarization state, the optical film 202 reflects at least about 60% of the first light 205 for at least one second wavelength W2 less than the at least one first wavelength W1 of the transmission band 402. In some embodiments, for the substantially normally incident first light 205 and for the at least one polarization state, the optical film 202 reflects at least about 70%, at least about 80%, or least about 90% of the first light 205 for the at least one second wavelength W2 less than the at least one first wavelength W1 of the transmission band 402. For example, as shown in FIG. 4A, the at least one second wavelength W2 is about 415 nm. In some embodiments, the at least one polarization state includes the first polarization state and the orthogonal second polarization state. In some embodiments, the at least one polarization state includes the first polarization state or the orthogonal second polarization state.

In some embodiments, for the substantially normally incident light 205 and for each of the first and second polarization states, the plurality of microlayers 15 reflects at least about 60% of the incident light 205 for at least one wavelength less than the first low wavelength 408 of the FWHM 405 of the transmission band 402. In some cases, the at least one wavelength less than the first low wavelength 408 may correspond to the at least one second wavelength W2. In some embodiments, for the substantially normally incident light 205 and for each of the first and second polarization states, the plurality of microlayers 15 reflects at least about 70%, or at least about 80% of the incident light 205 for the at least one wavelength less than the first low wavelength 408 of the FWHM 405 of the transmission band 402.

Referring now to FIGS. 2 and 4B, in some embodiments, for the second light 207 incident at the oblique angle θo greater than about half of the viewing angle θv with respect to the normal N to the major surface 204 of the optical film 202 and for the at least one polarization state, the optical film 202 transmits at least about 60% of the second light 207 for the at least one second wavelength W2. In some embodiments, for the second light 207 incident at the oblique angle θo greater than about 30 degrees with respect to the normal N to the major surface 204 of the optical film 202 and for the at least one polarization state, the packet 206 transmits at least about 60% of the second light 207 for the at least one second wavelength W2. In some embodiments, for the second light 207 incident at the oblique angle θo with respect to the normal N and for the at least one polarization state, the optical film 202 transmits at least about 70%, at least about 75%, or at least about 80% of the second light 207 for the at least one second wavelength W2. In some embodiments, for the second light 207 incident at the oblique angle θo with respect to the normal N and for the at least one polarization state, the packet 206 transmits at least about 70%, at least about 75%, or at least about 80% of the second light 207 for the at least one second wavelength W2. In some embodiments, the at least one polarization state includes the first polarization state and the orthogonal second polarization state. In some embodiments, the at least one polarization state includes the first polarization state or the orthogonal second polarization state.

Referring to FIGS. 2 and 4C, in some embodiments, for the at least one polarization state and for the at least one second wavelength W2, the optical film 202 reflects at least about 60% of the first light 205, but transmits at least about 60% of the second light 207. Further, in some embodiments, the at least one second wavelength W2 is disposed in a wavelength range from about 387 nm to about 434 nm. In some embodiments, for the second light 207 incident at the oblique angle θo with respect to the normal N and for the at least one polarization state, the optical film 202 transmits at least about 80% of the second light 207 for the at least one second wavelength W2 in the wavelength range from about 387 nm to about 434 nm.

Due to angular filtering of the light control film 150 (shown in FIG. 1), an on-axis viewer (e.g., the viewer 14 shown in FIG. 1) may receive the display light 10 that is within the viewing angle θv, while an off-axis viewer may not receive any display light 10. However, the off-axis viewer can receive obliquely incident ambient light that is reflected by the optical film 202. For the at least one second wavelength W2 in the UV wavelength range and the low blue wavelength range, the optical film 202 may substantially reflect the first light 205 and substantially transmit the second light 207. Therefore, the optical film 202 may protect the on-axis viewer from UV and low blue wavelengths present in the display light 10 (shown in FIG. 1) as the optical film 202 substantially reflects UV and low blue wavelengths that may be present in the display light 10. The optical film 202 may further protect the off-axis viewer from UV and low blue wavelengths present in ambient light as the optical film 202 substantially transmits UV and low blue wavelengths that may be present in the obliquely incident light.

In some embodiments, the at least one second wavelength W2 is less than the first low wavelength 408 by at most about 40% of the FWHM 405 of the transmission band 402. In other words, a difference between the first low wavelength 408 and the at least one second wavelength W2 is at most about 40% of the transmission bandwidth of the FWHM 405 of the transmission band 402. In some embodiments, the at least one second wavelength W2 is less than the first low wavelength 408 by at most about 35%, or at most about 30% of the FWHM 405 of the transmission band 402.

Referring to FIGS. 2 and 4A, in some embodiments, for the substantially normally incident first light 205 and for the at least one polarization state, the optical film 202 reflects at least about 60% of the first light 205 for at least one third wavelength W3 within the FWHM 455 of the reflection band 452. In some embodiments, for the substantially normally incident first light 205 and for the at least one polarization state, the optical film 202 reflects at least about 70%, or at least about 80% of the first light 205 for the at least one third wavelength W3 within the FWHM 455 of the reflection band 452.

For example, as shown in FIG. 4A, the at least one third wavelength W3 is about 675 nm. In some embodiments, the at least one polarization state includes the first polarization state and the orthogonal second polarization state. In some embodiments, the at least one polarization state includes the first polarization state or the orthogonal second polarization state. In some embodiments, the plurality of microlayers 15 has an average optical reflectance of greater than about 80% across the FWHM 455 of the primary reflection band 452 for each of the mutually orthogonal first and second polarization states.

Referring now to FIGS. 2 and 4B, in some embodiments, for the second light 207 incident at the oblique angle θo greater than about half of the viewing angle θv with respect to the normal N to the major surface 204 of the optical film 202 and for the at least one polarization state, the optical film 202 reflects at least about 60% of the second light 207 for the at least one third wavelength W3. In some embodiments, for the second light 207 incident at the oblique angle θo greater than about 30 degrees with respect to the normal N to the major surface 204 of the optical film 202 and for the at least one polarization state, the packet 206 reflects at least about 60% of the second light 207 for the at least one third wavelength W3. In some embodiments, for the second light 207 incident at the oblique angle θo with respect to the normal N and for the at least one polarization state, the optical film 202 reflects at least about 70%, at least about 80%, or at least about 90% of the second light 207 for the at least one third wavelength W3. In some embodiments, for the second light 207 incident at the oblique angle θo with respect to the normal N and for the at least one polarization state, the packet 206 reflects at least about 70%, at least about 80%, or at least about 90% of the second light 207 for the at least one third wavelength W3. In some embodiments, the at least one polarization state includes the first polarization state and the orthogonal second polarization state. In some embodiments, the at least one polarization state includes the first polarization state or the orthogonal second polarization state.

Referring to the graph 400″ illustrated in FIG. 4C, in some embodiments, for the at least one polarization state and for the at least one third wavelength W3, the optical film 202 reflects at least about 60% of each of the first and second lights 205, 207. Further, in some embodiments, the at least one third wavelength W3 is disposed in a wavelength range from about 654 nm to about 695 nm. In some embodiments, for the substantially normally incident first light 205 and for the at least one polarization state, the optical film 202 reflects at least about 90% of the first light 205 for the at least one third wavelength W3 in the wavelength range from about 654 nm to about 695 nm.

In some embodiments, the at least one third wavelength W3 is greater than the second low wavelength 458 by at most about 50% of the FWHM 455 of the reflection band 452. In other words, a difference between the at least one third wavelength W3 and the second low wavelength 458 is at most about 50% of the reflection bandwidth of the FWHM 455 of the reflection band 452. In some embodiments, the at least one third wavelength W3 may be greater than the second low wavelength 458 by at most about 40%, or at most about 30% of the FWHM 455 of the reflection band 452.

Referring to FIGS. 2 and 4A, in some embodiments, for the substantially normally incident first light 205 and for the at least one polarization state, the optical film 202 transmits at least about 60% of the first light 205 for at least one fourth wavelength W4 less than the second low wavelength 458 and greater than the at least one first wavelength W1. In some embodiments, for the substantially normally incident first light 205 and for the at least one polarization state, the optical film 202 transmits at least about 70%, or at least about 80% of the first light 205 for the at least one fourth wavelength W4 less than the second low wavelength 458 and greater than the at least one first wavelength W1. For example, as shown in FIG. 4A, the at least one fourth wavelength W4 is about 575 nm. In some embodiments, the at least one polarization state includes the first polarization state and the orthogonal second polarization state. In some embodiments, the at least one polarization state includes the first polarization state or the orthogonal second polarization state. In some embodiments, for the substantially normally incident light 205 and for each of the first and second polarization states, the plurality of microlayers 15 transmits at least about 60% of the incident light 205 for at least one wavelength less than the second low wavelength 458 of the FWHM 455 of the primary reflection band 452, and greater than the first low wavelength 408 of the FWHM 405 of the transmission band 402. In some cases, the at least one wavelength less than the second low wavelength 458 of the FWHM 455 of the primary reflection band 452, and greater than the first low wavelength 408 of the FWHM 405 of the transmission band 402 may correspond to the at least one fourth wavelength W4. In some embodiments, for the substantially normally incident light 205 and for each of the first and second polarization states, the plurality of microlayers 15 transmits at least about 70%, or at least about 80% of the incident light 205 for the at least one wavelength less than the second low wavelength 458 of the FWHM 455 of the primary reflection band 452, and greater than the first low wavelength 408 of the FWHM 405 of the transmission band 402.

Referring now to FIGS. 2 and 4B, in some embodiments, for the second light 207 incident at the oblique angle θo greater than about half of the viewing angle θv with respect to the normal N to the major surface 204 of the optical film 202 and for the at least one polarization state, the optical film 202 reflects at least about 60% of the second light 207 for the at least one fourth wavelength W4. In some embodiments, for the second light 207 incident at the oblique angle θo greater than about 30 degrees with respect to the normal N to the major surface 204 of the optical film 202 and for the at least one polarization state, the packet 206 reflects at least about 60% of the second light 207 for the at least one fourth wavelength W4. In some embodiments, for the second light 207 incident at the oblique angle θo with respect to the normal N and for the at least one polarization state, the optical film 202 reflects at least about 70%, at least about 80%, or at least about 90% of the second light 207 for the at least one fourth wavelength W4. In some embodiments, for the second light 207 incident at the oblique angle θo with respect to the normal N and for the at least one polarization state, the packet 206 reflects at least about 70%, at least about 80%, or at least about 90% of the second light 207 for the at least one fourth wavelength W4. For example, as shown in FIG. 4A, the at least one fourth wavelength W4 is about 575 nm. In some embodiments, the at least one polarization state includes the first polarization state and the orthogonal second polarization state. In some embodiments, the at least one polarization state includes the first polarization state or the orthogonal second polarization state.

Referring to the graph 400" illustrated in FIG. 4C, for the at least one polarization state and for the at least one fourth wavelength W4, the optical film 202 transmits at least about 60% of the first light 205, but reflects at least about 60% of the second light 207. Further, in some embodiments, the at least one fourth wavelength W4 is disposed in a wavelength range from about 548 nm to about 646 nm. In some embodiments, for the substantially normally incident first light 205 and for the at least one polarization state, the optical film 202 transmits at least about 90% of the first light 205 for the at least one fourth wavelength W4 in the wavelength range from about 548 nm to about 646 nm.

For the at least one fourth wavelength W4 in the visible wavelength range, the optical film 202 may substantially transmit the first light 205 and substantially reflect the second light 207. An on-axis viewer can therefore receive the display light 10 without substantial color shift. Further, the optical film 202 may reflect ambient light with a desired color towards an off-axis viewer, while substantially transmitting UV and low blue wavelengths.

In some embodiments, the at least one fourth wavelength W4 is less than the second low wavelength 458 by at most about 60% of the FWHM 455 of the reflection band 452. In other words, a difference between the second low wavelength 458 and the at least one fourth wavelength W4 is at most about 60% of the reflection bandwidth of the FWHM 455 of the reflection band 452. In some embodiments, the at least one fourth wavelength W4 may be less than the second low wavelength 458 by at most about 55%, or at most 50% of the FWHM 455 of the reflection band 452.

Referring to FIGS. 2 and 4A, in some embodiments, for the substantially normally incident first light 205 and for the at least one polarization state, the optical film 202 transmits at least about 60% of the first light 205 for at least one fifth wavelength W5 greater than the second high wavelength 462. In some embodiments, for the substantially normally incident first light 205 and for the at least one polarization state, the optical film 202 transmits at least about 70%, or at least about 80% of the first light 205 for the at least one fifth wavelength W5 greater than the second high wavelength 462. For example, as shown in FIG. 4A, the at least one fifth wavelength W5 is about 900 nm. In some embodiments, the at least one fifth wavelength W5 is in an infrared wavelength range. In some embodiments, the at least one polarization state includes the first polarization state and the orthogonal second polarization state. In some embodiments, the at least one polarization state includes the first polarization state or the orthogonal second polarization state.

Referring now to FIGS. 2 and 4B, in some embodiments, for the second light 207 incident at the oblique angle θo greater than about half of the viewing angle θv with respect to the normal N to the major surface 204 of the optical film 202 and for the at least one polarization state, the optical film 202 transmits at least about 60% of the second light 207 for the at least one fifth wavelength W5. In some embodiments, for the second light 207 incident at the oblique angle θo greater than about 30 degrees with respect to the normal N to the major surface 204 of the optical film 202 and for the at least one polarization state, the packet 206 transmits at least about 60% of the second light 207 for the at least one fifth wavelength W5. In some embodiments, for the second light 207 incident at the oblique angle θo with respect to the normal N and for the at least one polarization state, the optical film 202 transmits at least about 70%, or at least about 80% of the second light 207 for the at least one fifth wavelength W5. In some embodiments, for the second light 207 incident at the oblique angle θo with respect to the normal N and for the at least one polarization state, the packet 206 transmits at least about 70%, or at least about 80% of the second light 207 for the at least one fifth wavelength W5. In some embodiments, the at least one polarization state includes the first polarization state and the orthogonal second polarization state. In some embodiments, the at least one polarization state includes the first polarization state or the orthogonal second polarization state.

Referring to the graph 400" illustrated in FIG. 4C, in some embodiments, for the at least one polarization state and for the at least one fifth wavelength W5, the optical film 202 transmits at least about 60% of each of the first and second lights 205, 207. In some embodiments, the at least one fifth wavelength W5 can be any wavelength greater than about 860 nm. In some embodiments, for the substantially normally incident first light 205 and for the at least one polarization state, the optical film 202 transmits at least about 90% of the first light 205 for the at least one fifth wavelength W5.

Figure 5A:
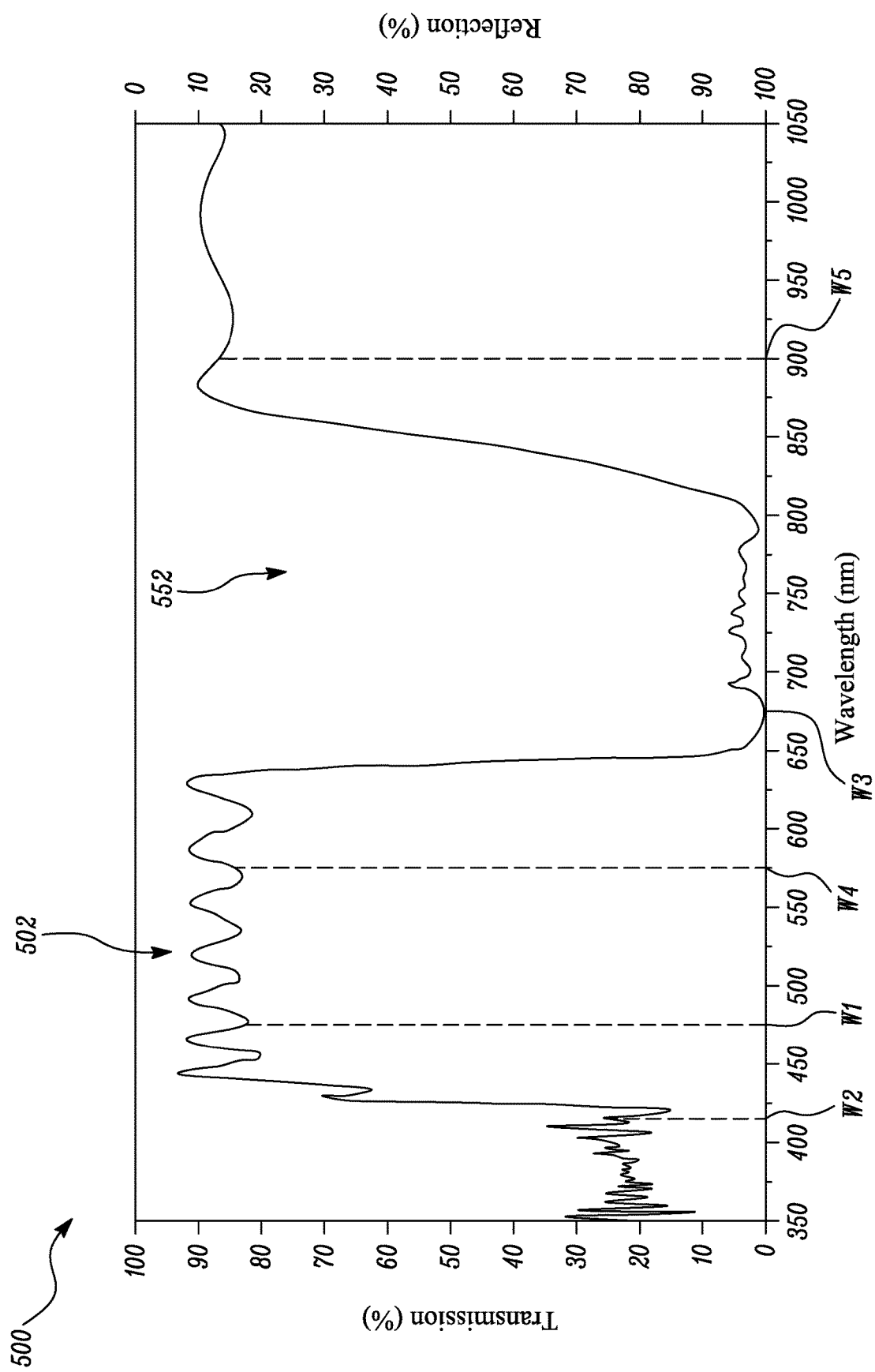
FIG. 5A is a graph illustrating transmission versus wavelength of the optical film having a different configuration as that of the optical film corresponding to FIG. 4A, for a substantially normal incidence, according to an embodiment of the present disclosure.
Figure 5B:
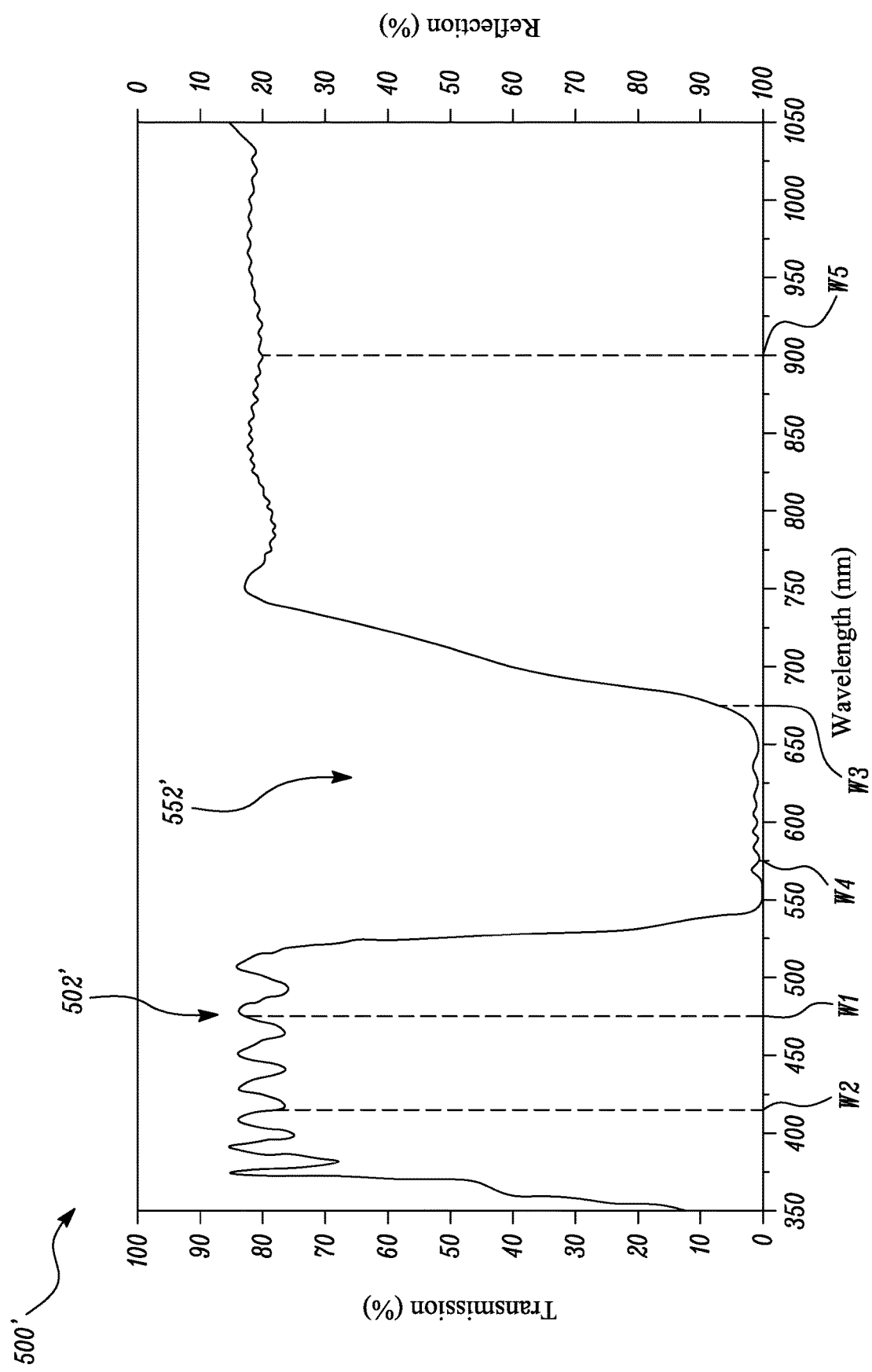
FIG. 5B is a graph illustrating transmission versus wavelength of the optical film having a similar configuration as that of the optical film corresponding to FIG. 5A, for an oblique incidence, according to an embodiment of the present disclosure.

FIGS. 5A and 5B illustrate graphs 500, 500', respectively, depicting transmission versus wavelength of the optical film 202, in accordance with an embodiment of the present disclosure. A configuration of the optical film 202 corresponding to the graphs 500, 500' is different from the configuration corresponding to FIG. 4A. FIG. 5A illustrates the graph 500 depicting transmission versus wavelength of the optical film 202 for a substantially normal incidence (i.e., the first light 205 shown in FIG. 2). FIG. 5B illustrates the graph 500' depicting transmission versus wavelength of the optical film 202 for an oblique incidence (i.e., the second light 207 shown in FIG. 2). Wavelength is expressed in nanometers (nm) in the abscissa. Transmission is expressed as a transmission percentage in the left ordinate. Reflection is expressed as reflection percentage in the right ordinate. The reflection percentage is complementary to the transmission percentage, i.e., reflection percentage=(100−transmission percentage).

Referring to FIGS. 2 and 5B, in the illustrated embodiment, the oblique angle θo corresponding to the graph 500' is about 60 degrees with respect to the normal N. However, it should be noted that the oblique angle θo is greater than half of the viewing angle θv (shown in FIG. 1).

Further, the configuration of the optical film 202 corresponding to FIGS. 5A and 5B includes the first and second polymeric layers 210, 212 numbering 224 in total, with an F-ratio of about 0.6. Moreover, the first and second polymeric layers 210, 212 include PMMA and PET, respectively. In other words, the configuration of the optical film 202 corresponding to FIGS. 5A and 5B includes a 224-layer PMMA/PET multilayer optical film having an F-ratio of about 0.6.

Figure 5C:
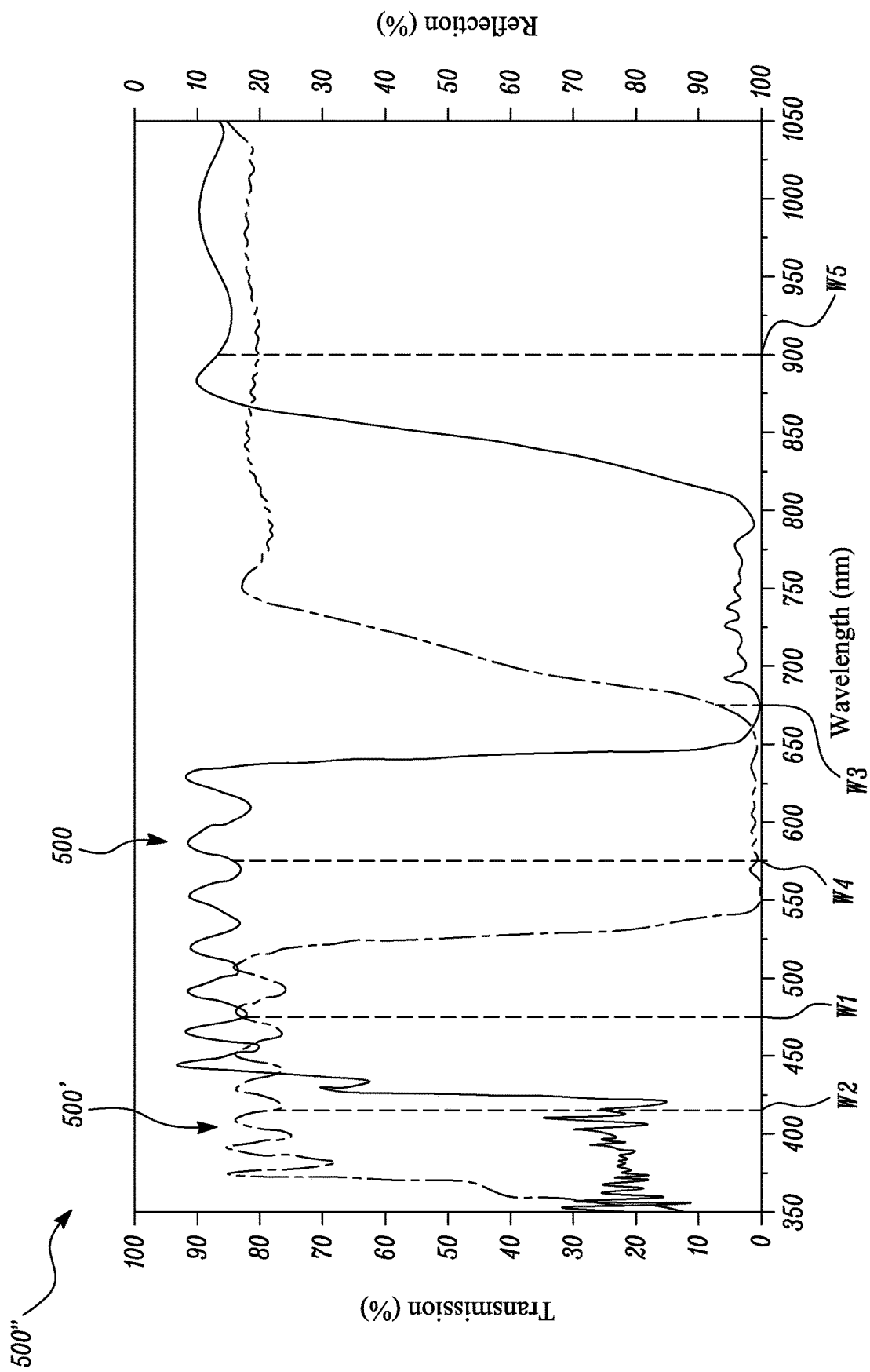
FIG. 5C is a graph illustrating transmission versus wavelength of the graphs of FIGS. 5A and 5B, according to an embodiment of the present disclosure.

FIG. 5C shows a graph 500" illustrating transmission versus wavelength of the graphs 500, 500'.

As shown in the graph 500, the optical film 202 includes a transmission band 502 and a reflection band 552. As shown in the graph 500', the optical film 202 includes a shifted transmission band 502' and a shifted reflection band 552'.

Referring to FIGS. 2 and 5C, in some embodiments, for the at least one polarization state and for the at least one first wavelength W1, the optical film 202 transmits at least about 60% of each of the first and second lights 205, 207. Further, in some embodiments, the at least one first wavelength W1 is disposed in the wavelength range from about 440 nm to about 530 nm. In some embodiments, for the at least one polarization state and for the at least one second wavelength W2, the optical film 202 reflects at least about 60% of the first light 205, but transmits at least about 60% of the second light 207. Further, in some embodiments, the at least one second wavelength W2 is disposed in a wavelength range from about 372 nm to about 422 nm.

Referring again to FIGS. 2 and 5C, in some embodiments, for the at least one polarization state and for the at least one third wavelength W3, the optical film 202 reflects at least about 60% of each of the first and second lights 205, 207. Further, in some embodiments, the at least one third wavelength W3 is disposed in the wavelength range from about 654 nm to about 695 nm. In some embodiments, for the at least one polarization state and for the at least one fourth wavelength W4, the optical film 202 transmits at least about 60% of the first light 205, but reflects at least about 60% of the second light 207. Further, in some embodiments, the at least one fourth wavelength W4 is disposed in the wavelength range from about 548 nm to about 646 nm.

Referring to the graphs 400", 500" shown in FIGS. 4C and 5C, respectively, it may be apparent that the optical transmittance versus wavelength of the optical film 202 changes for the different configurations at least in the wavelength range from about 372 nm to about 422 nm, which includes the at least one second wavelength W2. For the substantially normally incident first light 205 and for the at least one polarization state, the optical film 202 corresponding to FIGS. 4A-4C reflects at least 90% of the first light 205 for the at least one second wavelength W2 in an ultraviolet (UV) wavelength range from about 410 nm to about 420 nm. However, for the substantially normally incident first light 205 and for the at least one polarization state, the optical film 202 corresponding to FIGS. 5A-5C reflects at most about 90% of the first light 205 in the UV wavelength range from about 410 nm to about 420 nm. In other words, for the substantially normally incident first light 205 and for the at least one polarization state, the optical film 202 corresponding to FIGS. 5A-5C transmits at least about 10% of the first light 205 for the at least one second wavelength W2 in the UV wavelength range from about 410 nm to about 420 nm. The optical film 202 corresponding to FIGS. 5A-5C may therefore have a greater average optical transmittance in the UV wavelength range from about 410 nm to about 420 nm relative to the optical film 202 corresponding to FIGS. 4A-4C.

It may also be apparent from FIGS. 4C and 5C that for a given layer number and material combination of the first and second polymeric layers 210, 212, a change in F-ratio may substantially impact the optical characteristics of the optical film 202 at least in the UV wavelength range. In some cases, an average reflectance or reflection strength of the secondary reflection band 456 corresponding to the UV wavelength range may increase with greater deviation of the F-ratio from 0.5. The reflection strength of the secondary reflection band 456 may be minimum when the F-ratio is about 0.5. Further, the reflection strength of the secondary reflection band 456 may increase with an increase or decrease in the F-ratio from 0.5. In some embodiments, the optical film 202 has an average optical reflectance of greater than about 60% across at least the UV wavelength range for an F-ratio between about 0.25 to about 0.35 or about 0.65 to about 0.75.

Figure 6A:
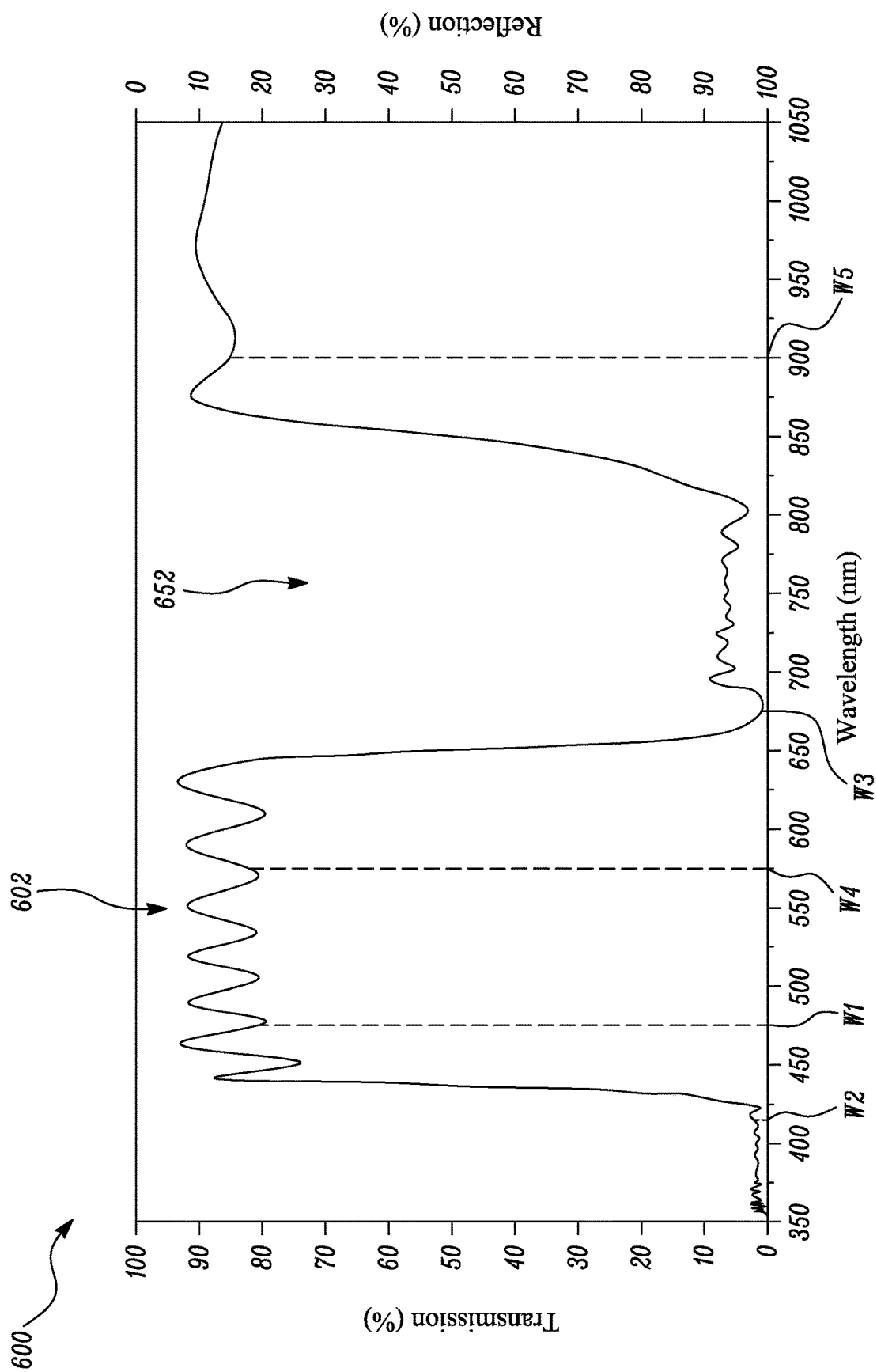
FIG. 6A is a graph illustrating transmission versus wavelength of the optical film having a different configuration as that of the optical films corresponding to FIGS. 4A and 5A, for a substantially normal incidence, according to an embodiment of the present disclosure.
Figure 6B:
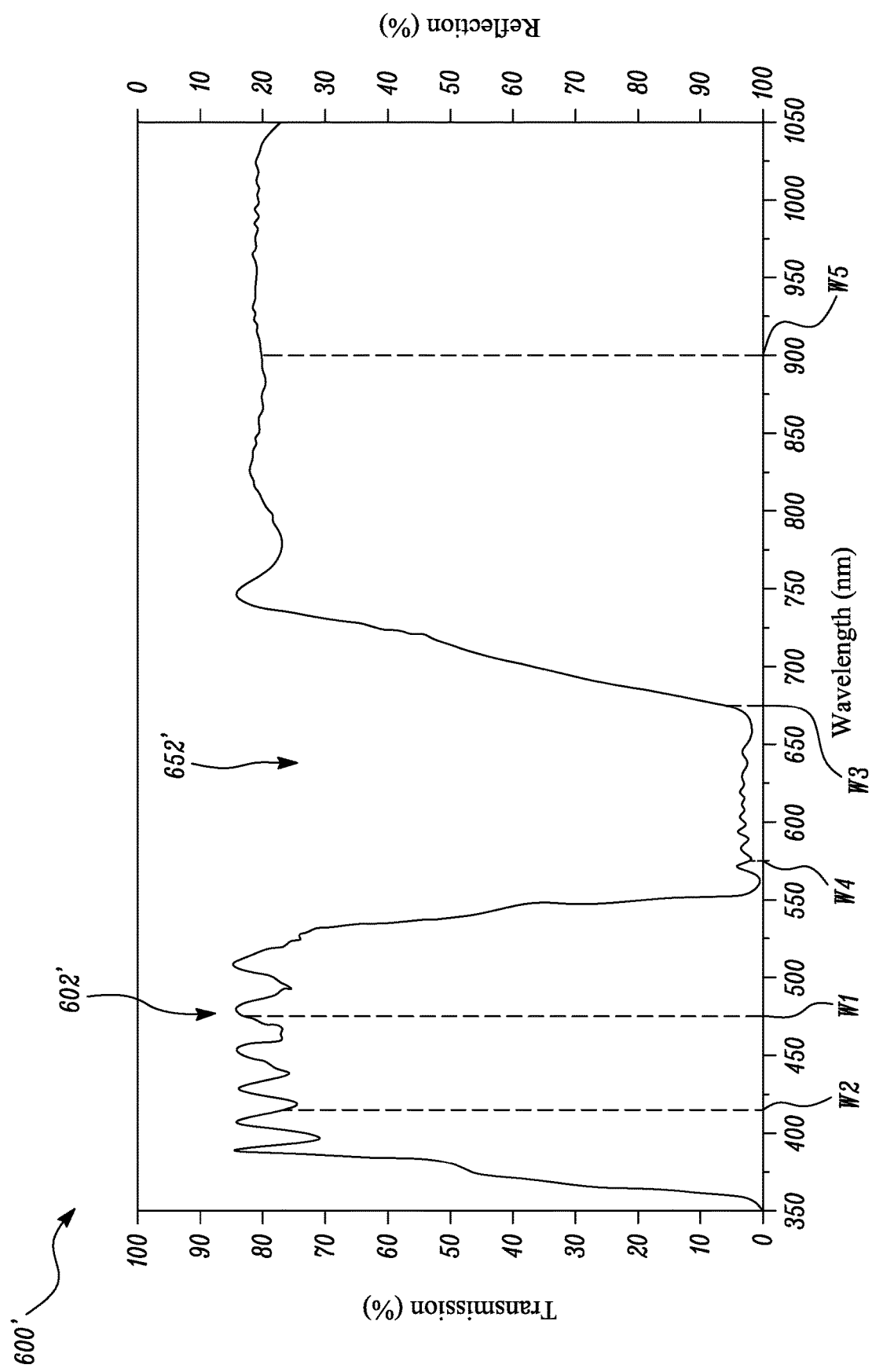
FIG. 6B is a graph illustrating transmission versus wavelength of the optical film having a similar configuration as that of the optical film corresponding to FIG. 6A, for an oblique incidence, according to an embodiment of the present disclosure.

FIGS. 6A and 6B illustrate graphs 600, 600', respectively, depicting optical transmission versus wavelength of the optical film 202, in accordance with an embodiment of the present disclosure. A configuration of the optical film 202 corresponding to the graphs 600, 600' is different from the configurations corresponding to FIGS. 4A and 5A. FIG. 6A illustrates the graph 600 depicting transmission versus wavelength of the optical film 202 for a substantially normal incidence (i.e., the first light 205 shown in FIG. 2). FIG. 6B illustrates the graph 600' depicting transmission versus wavelength of the optical film 202 for an oblique incidence (i.e., the second light 207 shown in FIG. 2). Wavelength is expressed in nanometers (nm) in the abscissa. Transmission is expressed as a transmission percentage in the left ordinate. Reflection is expressed as a reflection percentage in the right ordinate. The reflection percentage is complementary to the transmission percentage, i.e., reflection percentage=(100−transmission percentage).

Referring to FIGS. 2 and 6B, in the illustrated embodiment, the oblique angle θo corresponding to the graph 600' is about 60 degrees with respect to the normal N. However, it should be noted that the oblique angle θo is greater than half of the viewing angle θv (shown in FIG. 1).

Further, the configuration of the optical film 202 corresponding to FIGS. 6A and 6B includes the first and second polymeric layers 210, 212 numbering 275 in total, with an F-ratio of about 0.72.

Moreover, the first and second polymeric layers 210, 212 include PMMA and PET, respectively. In other words, the configuration of the optical film 202 corresponding to FIGS. 6A and 6B includes a 275-layer PMMA/PET multilayer optical film having an F-ratio of about 0.72.

Figure 6C:
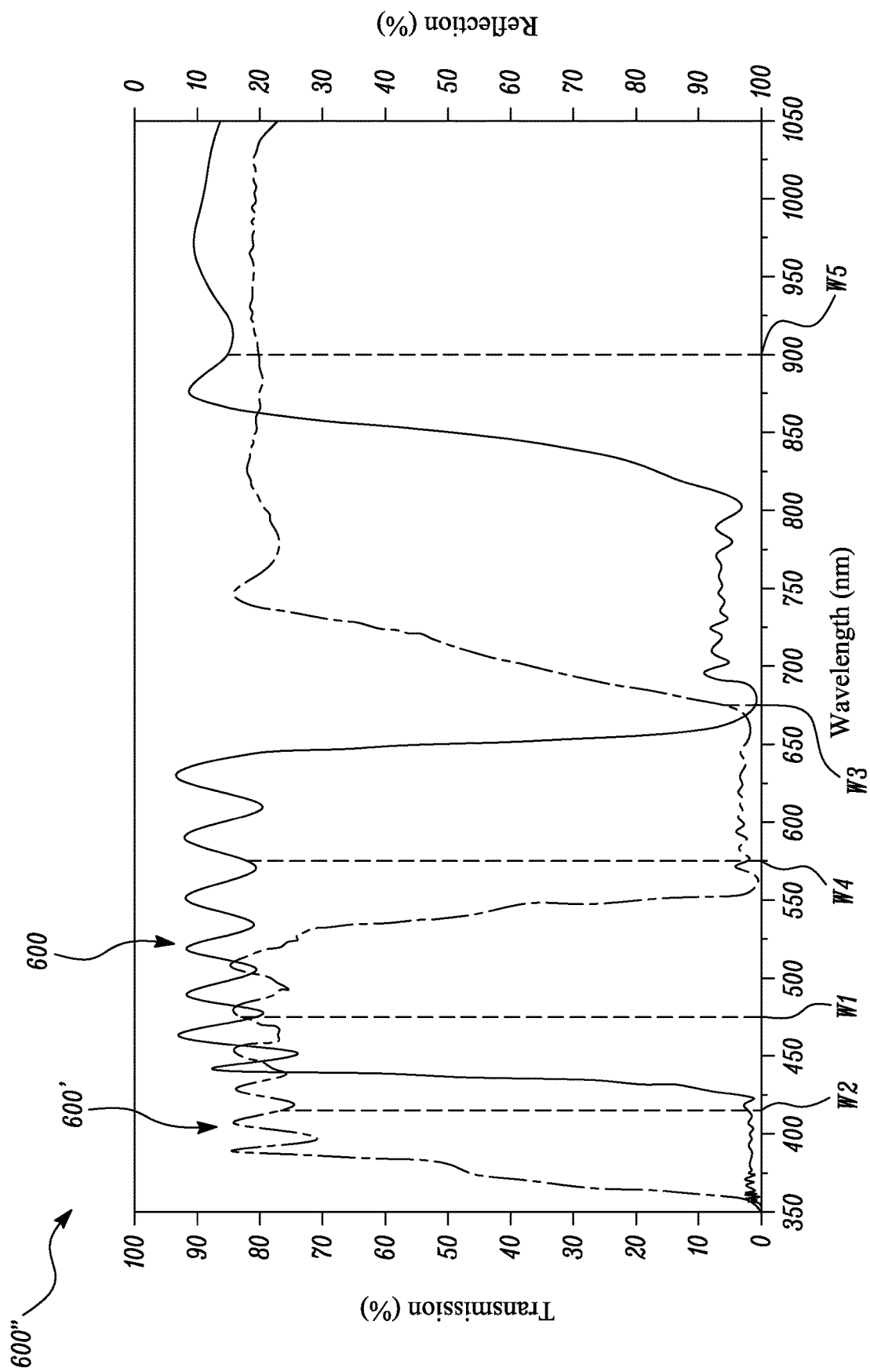
FIG. 6C is a graph illustrating transmission versus wavelength of the graphs of FIGS. 6A and 6B, according to an embodiment of the present disclosure.

FIG. 6C shows a graph 600" illustrating transmission versus wavelength of the graphs 600, 600'.

As shown in the graph 600, the optical film 202 includes a transmission band 602 and a reflection band 652. As shown in the graph 600', the optical film 202 includes a shifted transmission band 602' and a shifted reflection band 652'.

Referring to FIGS. 2 and 6C, in some embodiments, for the at least one polarization state and for the at least one first wavelength W1, the optical film 202 transmits at least about 60% of each of the first and second lights 205, 207. Further, in some embodiments, the at least one first wavelength W1 is disposed in the wavelength range from about 440 nm to about 530 nm. In some embodiments, for the at least one polarization state and for the at least one second wavelength W2, the optical film 202 reflects least about 60% of the first light 205, but transmits at least about 60% of the second light 207. Further, in some embodiments, the at least one second wavelength W2 is disposed in the wavelength range from about 387 nm to about 434 nm.

Referring again to FIGS. 2 and 6C, in some embodiments, for the at least one polarization state and for the at least one third wavelength W3, the optical film 202 reflects at least about 60% of each of the first and second lights 205, 207. Further, in some embodiments, the at least one third wavelength W3 is disposed in the wavelength range from about 654 nm to about 695 nm. In some embodiments, for the at least one polarization state and for the at least one fourth wavelength W4, the optical film 202 transmits at least about 60% of the first light 205, but reflects at least about 60% of the second light 207. Further, in some embodiments, the at least one fourth wavelength W4 is disposed in the wavelength range from about 548 nm to about 646 nm.

Referring to the graphs 400", 600" shown in FIGS. 4C and 6C, respectively, it may be apparent that the optical characteristics of the optical film 202 corresponding to FIGS. 6A-6C is substantially similar to the optical characteristics of the optical film 202 corresponding to FIGS. 4A-4C. It may also be apparent from FIGS. 4C and 6C that for a given F-ratio and material combination of the first and second polymeric layers 210, 212, a change in the layer number of the first and second polymeric layers 210, 212 may not substantially impact the optical characteristics of the optical film 202 at least in the UV wavelength range. Therefore, the F-ratio may have greater impact on the reflection strength of the secondary reflection band 456 of the optical film 202 as compared to the layer number.

Figure 7A:
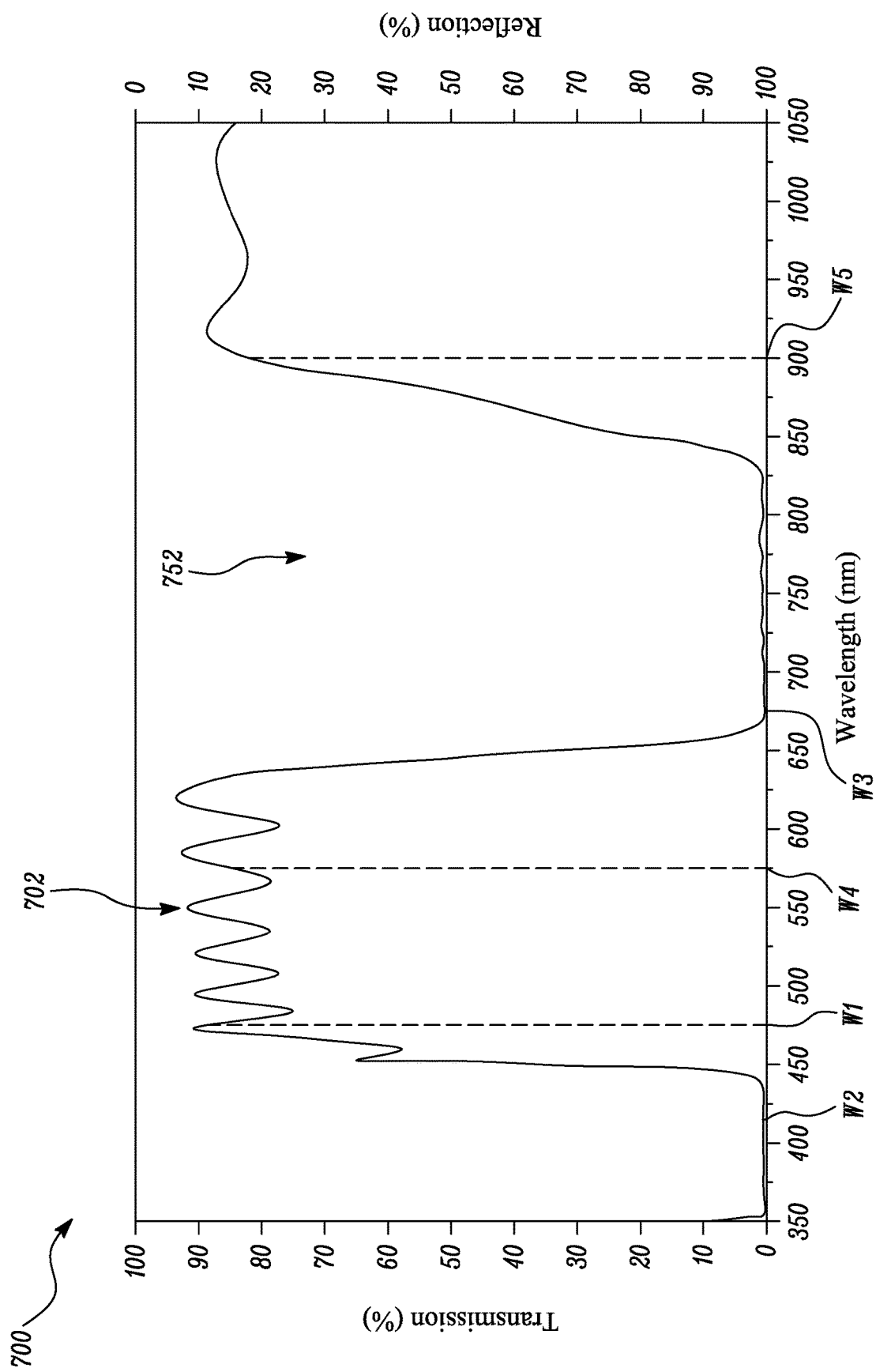
FIG. 7A is a graph illustrating transmission versus wavelength of the optical film having a different configuration as that of the optical films corresponding to FIGS. 4A, 5A, and 6A, for a substantially normal incidence, according to an embodiment of the present disclosure.
Figure 7B:
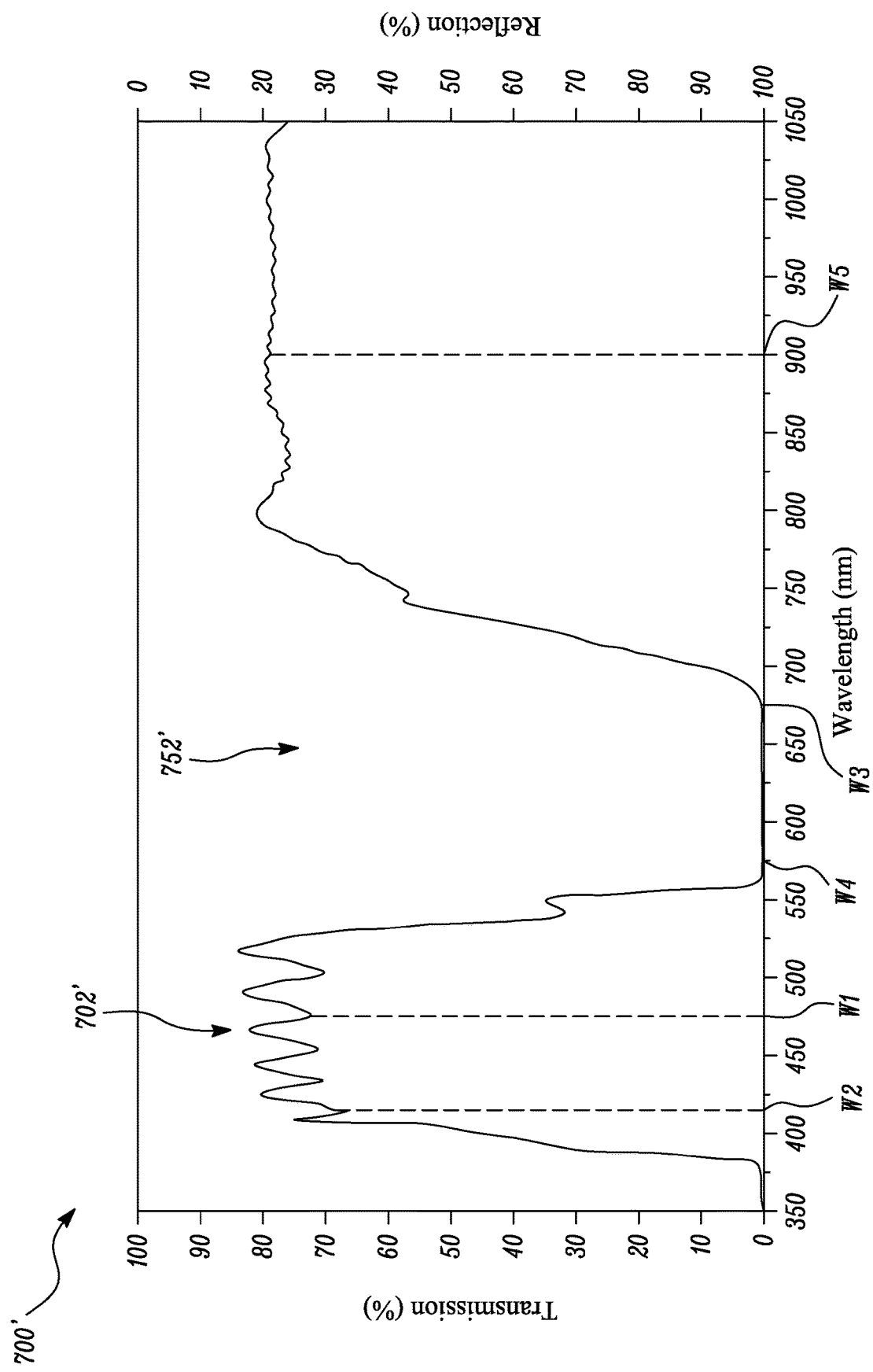
FIG. 7B is a graph illustrating transmission versus wavelength of the optical film having a similar configuration as that of the optical film corresponding to FIG. 7A, for an oblique incidence, according to an embodiment of the present disclosure.

FIGS. 7A and 7B illustrate exemplary graphs 700, 700', respectively, depicting transmission versus wavelength of the optical film 202, in accordance with an embodiment of the present disclosure. A configuration of the optical film 202 corresponding to the graphs 700, 700' is different from the each of the configurations corresponding to FIGS. 4A, 5A and 6A. FIG. 7A illustrates the graph 700 depicting transmission versus wavelength of the optical film 202 for a substantially normal incidence (i.e., the first light 205 shown in FIG. 2). FIG. 7B illustrates the graph 700' depicting transmission versus wavelength of the optical film 202 for an oblique incidence (i.e., the second light 207 in FIG. 2).

Wavelength is expressed in nanometers (nm) in the abscissa. Transmission is expressed as a transmission percentage in the left ordinate. Reflection is expressed as a reflection percentage in the right ordinate. The reflection percentage is complementary to the transmission percentage, i.e., reflection percentage=(100−transmission percentage).

In an example with reference to FIGS. 2 and 7B, in the illustrated embodiment, the oblique angle θo corresponding to the graph 700' is about 60 degrees with respect to the normal N. However, it should be noted that the oblique angle θo is greater than half of the viewing angle θv (shown in FIG. 1).

Further, the configuration of the optical film 202 corresponding to FIGS. 7A and 7B includes the first and second polymeric layers 210, 212 numbering 224 in total, with an F-ratio of about 0.72. Moreover, the first and second polymeric layers 210, 212 include PMMA and PEN, respectively. In other words, the configuration of the optical film 202 corresponding to FIGS. 7A and 7B includes a 224-layer PMMA/PEN multilayer optical film having an F-ratio of about 0.72.

Figure 7C:
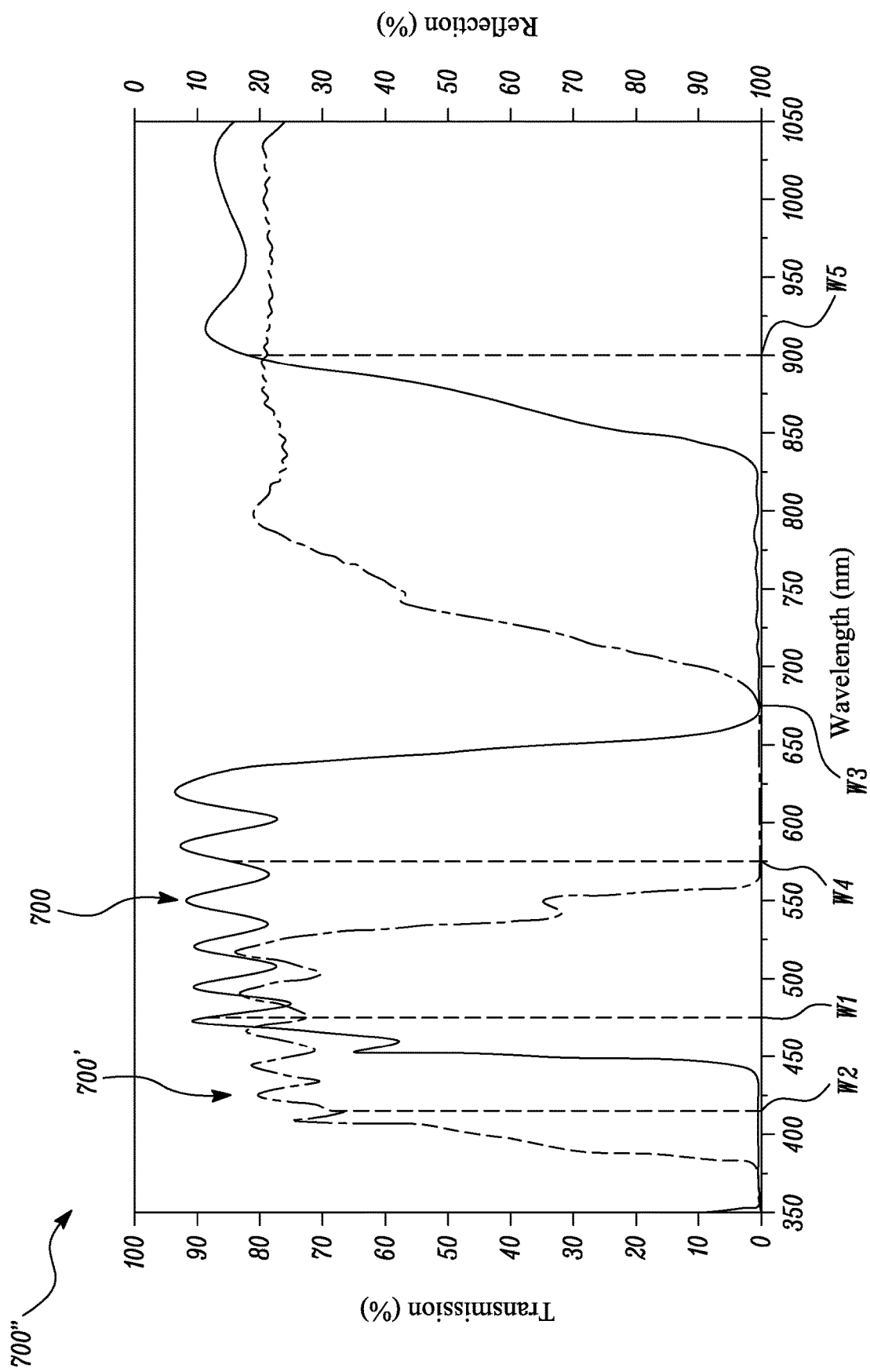
FIG. 7C is a graph illustrating transmission versus wavelength of the graphs of FIGS. 7A and 7B, according to an embodiment of the present disclosure.

FIG. 7C shows a graph 700" illustrating transmission versus wavelength of the graphs 700, 700'.

As shown in the graph 700, the optical film 202 includes a transmission band 702 and a reflection band 752. As shown in the graph 700', the optical film 202 includes a shifted transmission band 702' and a shifted reflection band 752'.

Referring to FIGS. 2 and 7C, in some embodiments, for the at least one polarization state and for the at least one first wavelength W1, the optical film 202 transmits at least about 60% of each of the first and second lights 205, 207. Further, in some embodiments, the at least one first wavelength W1 is disposed in the wavelength range from about 440 nm to about 530 nm. In some embodiments, for the at least one polarization state and for the at least one second wavelength W2, the optical film 202 reflects least about 60% of the first light 205, but transmits at least about 60% of the second light 207. In some embodiments, for the substantially normally incident first light 205 and for the at least one polarization state, the optical film 202 reflects at least about 80%, at least about 90%, or at least about 99% of the first light 205 for the at least one second wavelength W2. Further, in some embodiments, the at least one second wavelength W2 is disposed in the wavelength range from about 408 nm to about 449 nm.

Referring again to FIGS. 2 and 7C, as shown in the graph 700", for the at least one polarization state and for the at least one third wavelength W3, the optical film 202 reflects at least about 90% of each of the first and second lights 205, 207. Further, in some embodiments, the at least one third wavelength W3 is disposed in the wavelength range from about 654 nm to about 695 nm. In some embodiments, for the at least one polarization state and for the at least one fourth wavelength W4, the optical film 202 transmits at least about 60% of the first light 205, but reflects at least about 60% of the second light 207. Further, in some embodiments, the at least one fourth wavelength W4 is disposed in the wavelength range from about 548 nm to about 646 nm.

Referring to the graphs 400", 700" shown in FIGS. 4C and 7C, respectively, it may be apparent that the optical transmittance versus wavelength of the optical film 202 changes for the different configurations at least in the wavelength range from about 408 nm to about 449 nm, which includes the at least one second wavelength W2. For the substantially normally incident first light 205 and for the at least one polarization state, the optical film 202 corresponding to FIGS. 4A-4C reflects at least 90% of the first light 205 for the at least one second wavelength W2 in the UV wavelength range from about 410 nm to about 420 nm. However, for the substantially normally incident first light 205 and for the at least one polarization state, the optical film 202 corresponding to FIGS. 7A-7C transmits at most about 5% of the first light 205 in the UV wavelength range from about 410 nm to about 420 nm.

The optical film 202 corresponding to FIGS. 7A-7C may therefore have a greater average optical reflectance in the UV wavelength range from about 410 nm to about 420 nm relative to the optical film 202 corresponding to FIGS. 4A-4C. Therefore, for a given layer number and F-ratio of the first and second polymeric layers 210, 212, the material combination of the first and second polymeric layers 210, 212 may change the reflection strength of the secondary reflection band 456 of the optical film 202. However, referring to FIGS. 4C, 5C and 7C, the F-ratio may have greater impact on the reflection strength of the secondary reflection band 456 of the optical film 202 as compared to the material combination.

Thus, it may be apparent from the graphs 400", 500", 600", and 700" that the optical characteristics, i.e., strengths of various transmission and reflection bands of the optical film 202 can be adjusted by varying at least one of the F-ratio, the materials of first and second polymeric layers 210, 212, and the total number of first and second polymeric layers 210, 212. Hence, a configuration of the optical film 202 may be varied to obtain different optical characteristics based on desired application attributes.

One skilled in the art will appreciate that there may be more examples other than those disclosed, that can be practiced with the embodiments of the present disclosure. The disclosed examples are presented for purposes of illustration and not limitation.

Referring to FIGS. 1-7C, for a substantially normal incidence and for the at least one polarization state, the optical film 202 may have a relatively low transmittance in the UV wavelength range from about 400 nm to about 420 nm. Moreover, for substantially normal incidence and for the at least one polarization state, the optical film 202 may have a relatively low transmittance in a wavelength range from about 350 nm to about 420 nm. For the substantially normally incident light 205 and for the at least one polarization state, the optical stack 200 including the optical film 202 may therefore have an overall low transmittance for UV light having wavelengths from about 400 nm to about 420 nm. This may safeguard the on-axis viewer 14 from the harmful effects of UV light as well as low wavelength blue light.

In some embodiments, the optical film 202 may be a partial mirror, such that the optical characteristics shown in FIGS. 4A-7C correspond to each of the first polarization state (e.g., p-polarized state) and the orthogonal second polarization state (e.g., s-polarization state). In some other embodiments, the optical film 202 may be polarization sensitive, such that the optical characteristics shown in FIGS. 4A-7C correspond to one of the first and second polarization states. For example, the optical characteristics of the optical film 202 shown in FIGS. 4A-7C may correspond to the first polarization state. The optical film 202 may be substantially reflective for the other one of the first and second polarization states, for example, the second polarization state. In some cases, the optical film 202 may act as a broadband reflector for the second polarization state and may substantially reflect UV light in the second polarization state.

Further, the second band edge 404 of the transmission band 402 is relatively sharp as compared to conventional films. For substantially normal incidence, the second band edge 404 may separate the UV wavelength range (from about 400 nm to about 420 nm) from a substantial portion (from about 450 nm to about 650 nm) of visible wavelength range, such that the optical film 202 may substantially block UV light, while substantially transmitting at least some wavelengths of visible light. Therefore, for substantially normal incidence, the optical film 202 has a relatively high transmittance for green light and a portion of red light. Hence, due to the sharpness of the second band edge 404 of the transmission band 402, the optical stack 200 may substantially transmit a considerable portion of visible light through the optical film 202. Thus, for substantially normal incidence, the optical stack 200 may not provide an undesirable color shift.

Referring again to FIGS. 1-7C, for an oblique incidence and for the at least one polarization state, the optical film 202 may have an overall high transmittance in the UV wavelength range from about 400 nm to about 420 nm. For the second light 207 incident at the oblique angle θo and for the at least one polarization state, the optical stack 200 including the optical film 202 may therefore have an overall high transmittance for UV light having wavelengths from about 400 nm to about 420 nm. Hence, for the oblique incidence and for the at least one polarization state, the optical film 202 may have a low reflectance for low wavelength blue light and UV light (from about 410 nm to about 420 nm) toward an off-axis viewer (not shown) located at an oblique angle with respect to the normal N. At such oblique angles and for the at least one polarization state, the optical stack 200 including the optical film 202 may have an overall high transmittance for the low wavelength blue ambient light, which may protect the off-axis viewer, located at oblique angles, from harmful effects of low wavelength blue light and UV light.

Referring to FIGS. 1-7C, the light control film 150, having the viewing angle θv of less than about 60 degrees, may prevent visible wavelengths of the display light 10 to be transmitted to the off-axis viewer located at greater than about half of the viewing angle θv with respect to the normal N. For the second light 207 incident at the oblique angle θo greater than half of the viewing angle θv, the optical stack 200 may have an overall high reflectance in a wavelength range from about 550 nm to about 700 nm. The optical stack 200 including the optical film 202 may therefore reflect golden to red color light toward the off-axis viewer upon being irradiated with an obliquely incident ambient light, thereby blocking displayed content at oblique angles. Hence, the optical stack 200 may provide privacy functionality to an on-axis viewer. Further, an off-axis viewer may observe a colored light in a design wavelength range and not a black display, which may otherwise be undesirable.

Therefore, the optical stack 200 including the optical film 202 may provide a dual functionality of privacy and blocking of low wavelength blue light and UV light for an on-axis viewer. Further, the optical stack 200 including the optical film 202 may protect an off-axis viewer from harmful effects of low wavelength blue light and UV light, which may otherwise cause macular degeneration.

Figure 8:
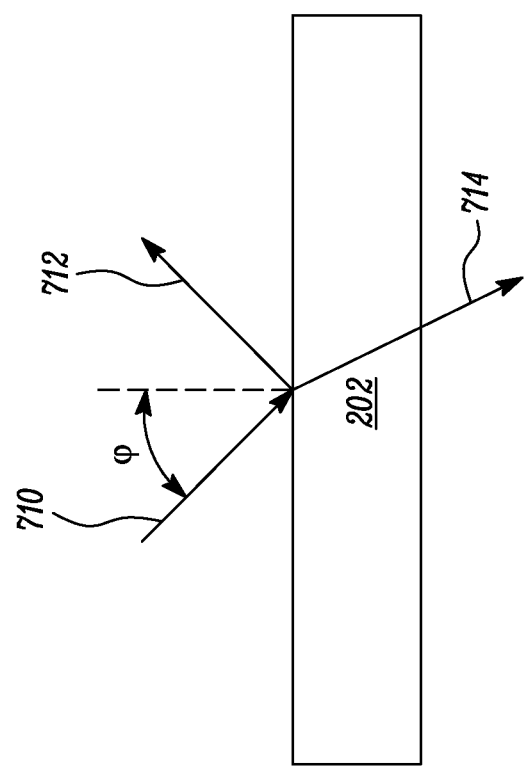
FIG. 8 illustrates a schematic view of the optical film, according to an embodiment of the present disclosure.

FIG. 8 illustrates a schematic view of the optical film 202, according to an embodiment of the present disclosure. A configuration of the optical film 202 corresponding to FIG. 8 includes the first and second polymeric layers 210, 212 (shown in FIG. 2) numbering 224 in total, with an F-ratio of 0.70.

Moreover, the first and second polymeric layers 210, 212 include PMMA and PET, respectively. In other words, the configuration of the optical film 202 corresponding to FIG. 8 includes a 224-layer PMMA/PET multilayer optical film.

As shown in FIG. 8, an incident light 710 is incident on the optical film 202 at an incident angle φ with respect to the normal N. In some embodiments, the incident light 710 may be incident substantially normally on the optical film 202. In other words, the incident light 710 may be propagating substantially parallel to the normal N, i.e., the incident angle φ of the incident light 710 may be less than about 5 degrees with respect to the normal N. In some other embodiments, the incident light 710 may be obliquely incident on the optical film 202. In some embodiments, the incident angle φ of the incident light 710 may be about 40 degrees with respect to the normal N.

In some embodiments, the optical film 202 may reflect at least a first portion of the incident light 710 as a reflected light 712. Further, the optical film 202 may transmit at least a second portion of the incident light 710 as a transmitted light 714. In some cases, at least the first portion of incident light 710 may substantially undergo specular reflection, thereby resulting in the reflected light 712. The reflected light 712, due to specular reflection, may therefore conform to the law of reflection. Thus, the reflected light 712 may have a reflection angle that is approximately equal to the incident angle φ.

In some embodiments, the incident light 710 may be from an illuminant D65. Illuminant D65, or CIE Standard Illuminant D65 is a commonly used standard illuminant defined by the International Commission on Illumination (CIE). It is part of a D series of illuminants that try to portray standard illumination conditions at open-air in different parts of the world. D65 corresponds roughly to the average midday light in Western Europe/Northern Europe and includes both direct sunlight and the light diffused by a clear sky. It is hence also referred to as a daylight illuminant. Further, the CIE positions D65 as the standard daylight illuminant.

A standard illuminant is represented as a table of averaged spectrophotometric data. Hence, any light source which statistically has the same relative spectral power distribution (SPD) as the defined Illuminant D65 can be considered a D65 light source.

According to the CIE Standard Illuminants for Colorimetry, D65 is intended to represent average daylight and has a correlated color temperature of approximately 6500 K. The CIE standard illuminant D65 is generally used in all colorimetric calculations requiring representative daylight, unless there are specific reasons for using a different illuminant. Further, the illuminant D65 light is considered to be white light in the CIE Lab color space.

The CIE Lab color space, also referred to as L*a*b*, is a color space defined by the CIE. It expresses color as three values: L* for perceptual lightness; and a* and b* for the four unique colors of human vision: red, green, blue, and yellow. CIE Lab is intended as a perceptually uniform space, where a given numerical change corresponds to similar perceived change in color. While the CIE Lab color space is not truly perceptually uniform, it nevertheless is useful in industry for detecting small differences in color.

The colors defined by the CIE Lab color space are not relative to any particular device, such as a computer monitor or a printer, but instead relate to the CIE standard observer which is an averaging of the results of color matching experiments under laboratory conditions.

The CIE Lab color space is three-dimensional, and covers the entire range of human color perception, or gamut. It is based on the opponent color model of human vision, where red/green forms an opponent pair, and blue/yellow forms an opponent pair. The lightness value L* defines black at 0 and white at 100. The a* axis is relative to the green-red opponent colors, with negative values toward green and positive values toward red. The b* axis represents the blue-yellow opponents, with negative numbers toward blue and positive toward yellow.

Figure 9A:
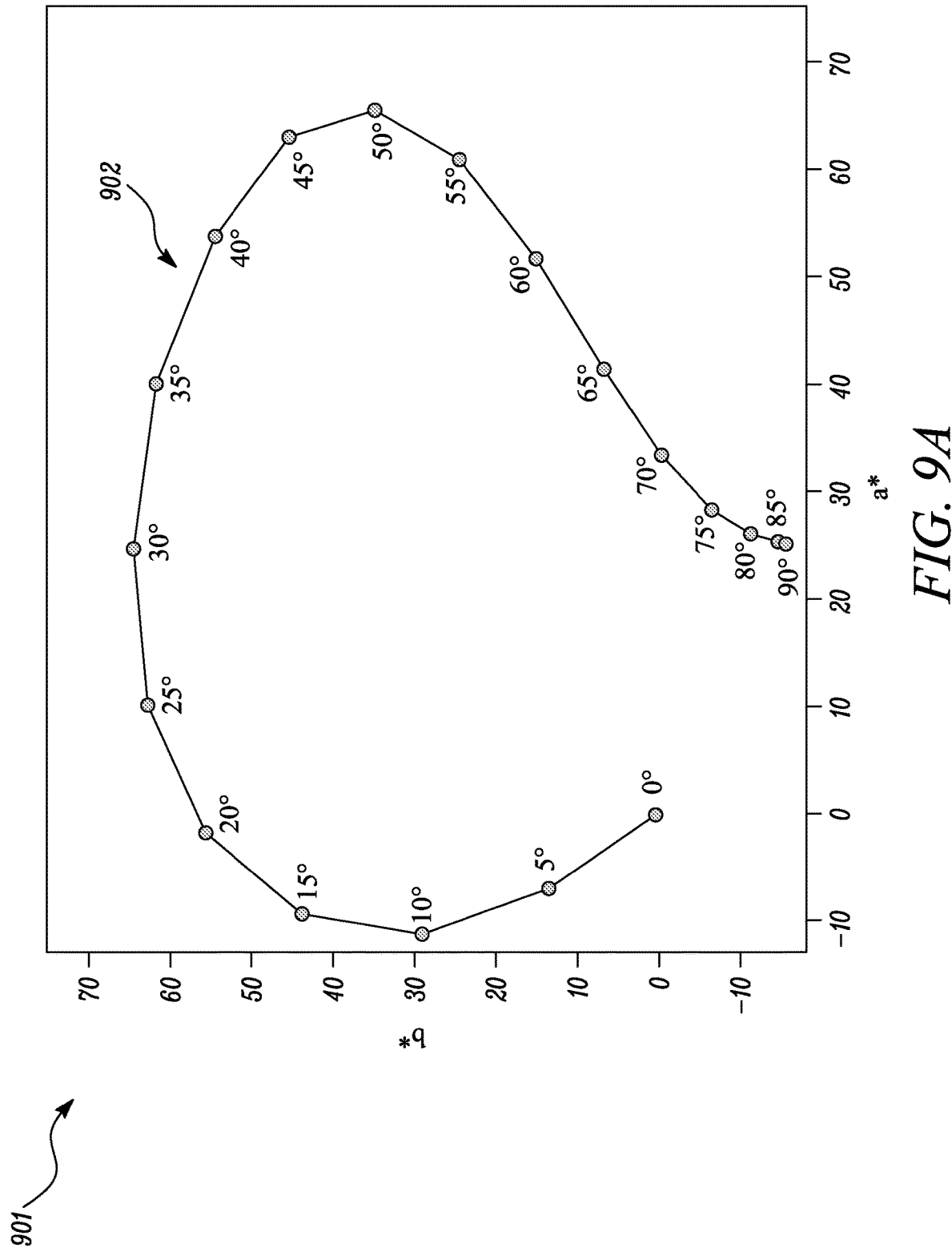
FIG. 9A is a chromaticity diagram for a light reflected by the optical film in response to a light incident on the optical film, according to an embodiment of the present disclosure.

FIG. 9A is a chromaticity diagram 901 illustrating a plot 902 depicting variation of colorimetric parameters a*, b* corresponding to the reflected light 712 (shown in FIG. 8), for different values of the incident angle φ of the incident light 710 (shown in FIG. 8). Different values of the incident angle φ, such as 20 degrees, 40 degrees, etc., are marked around an outline of the plot 902.

Referring to the diagram 901, for the incident light 710 having the incident angle φ less than about 5 degrees (i.e., substantially normal incidence), the reflected light 712 has the colorimetric parameter a* equal to about 0 and the colorimetric parameter b* equal to about 0. Therefore, for a substantially normal incidence, the reflected light 712 has a minimal variation in green-red opponent colors, and a minimal variation in blue-green opponent colors. Further, for the incident light 710 having the incident angle φ of about 50 degrees (i.e., oblique incidence), the reflected light 712 has the colorimetric parameter a* equal to about 65 and the colorimetric parameter b* equal to about 35. Therefore, for an oblique incidence (e.g., incident angle φ of about 50 degrees), the reflected light 712 has a considerable variation in green-red opponent colors and blue-yellow opponent colors, due to a higher deviation in the colorimetric parameters a*, b* (for φ of about 50 degrees) relative to the colorimetric parameters a*, b* of the reflected light 712 due to substantially normal incidence. In other words, for the incident light 710 having the incident angle φ of about 50 degrees (i.e., oblique incidence), the optical film 202 may provide a greater color shift in the reflected light 712. Hence, for the incident light 710 having the incident angle φ of about 40 degrees, about 50 degrees, 60 degrees, or about 70 degrees, the optical film 202 may provide a considerable color shift in the reflected light 712, such that an off-axis viewer may receive golden to red color light, while providing privacy to the on-axis viewer.

Figure 9B:
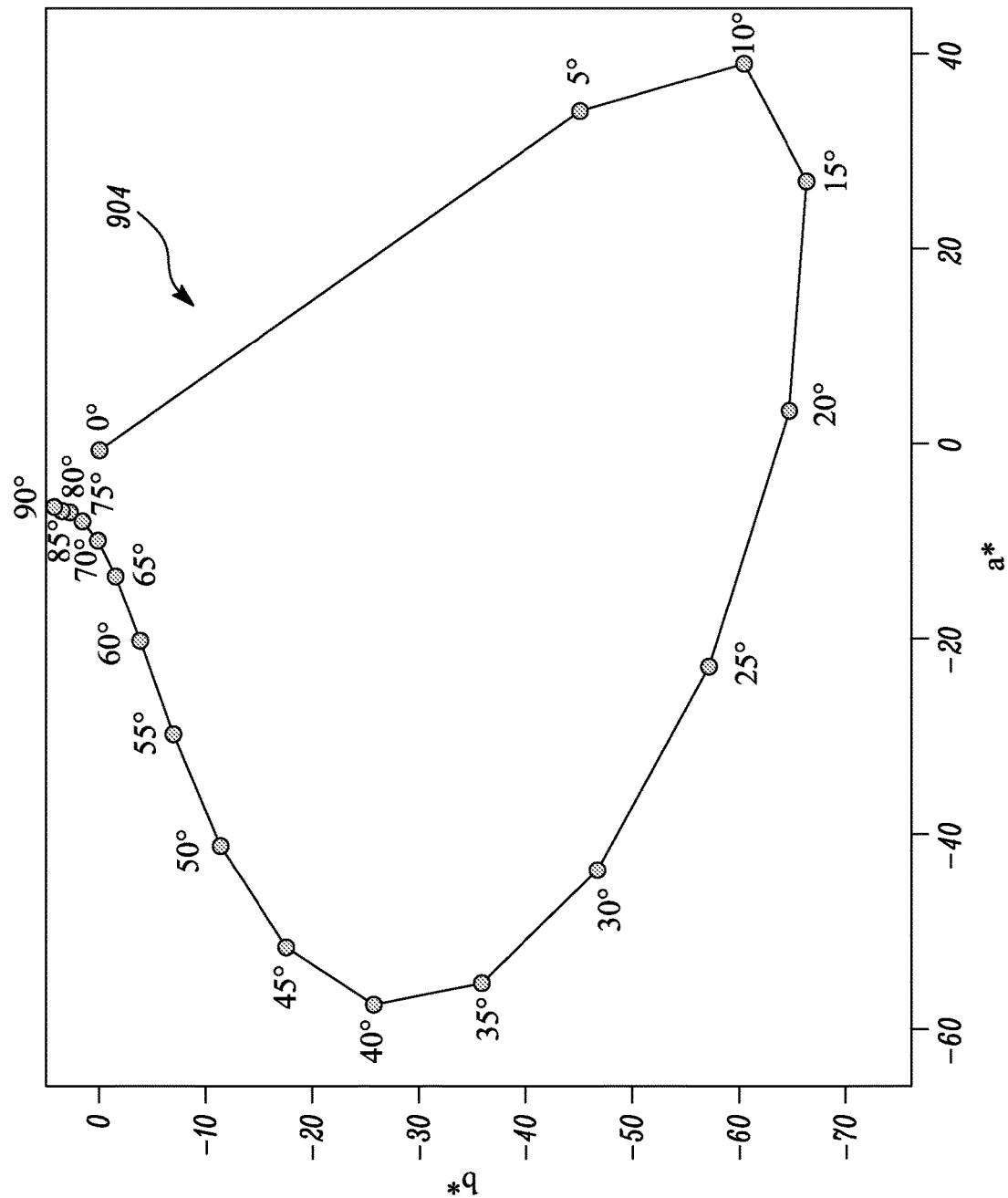
FIG. 9B is a chromaticity diagram for a light transmitted by the optical film in response to a light incident on the optical film, according to an embodiment of the present disclosure.

FIG. 9B is a chromaticity diagram 903 illustrating a plot 904 depicting variation of colorimetric parameters a*, b* corresponding to the transmitted light 714 (shown in FIG. 8), for different values of the incident angle φ of the incident light 710 (shown in FIG. 8). Different values of the incident angle φ, such as 20 degrees, 40 degrees, etc., are marked around an outline of the plot 904.

Referring to the diagram 903, for the incident light 710 having the incident angle φ less than about 5 degrees (i.e., substantially normal incidence), the transmitted light 714 has the colorimetric parameter a* equal to about 0 and the colorimetric parameter b* equal to about 0. Therefore, for a substantially normal incidence, the transmitted light 714 has a minimal variation in green-red opponent colors, and a minimal variation in blue-green opponent colors. Thus, for substantially normal incidence, the optical film 202 may not provide an undesirable color shift to the on-axis viewer.

Figure 10:
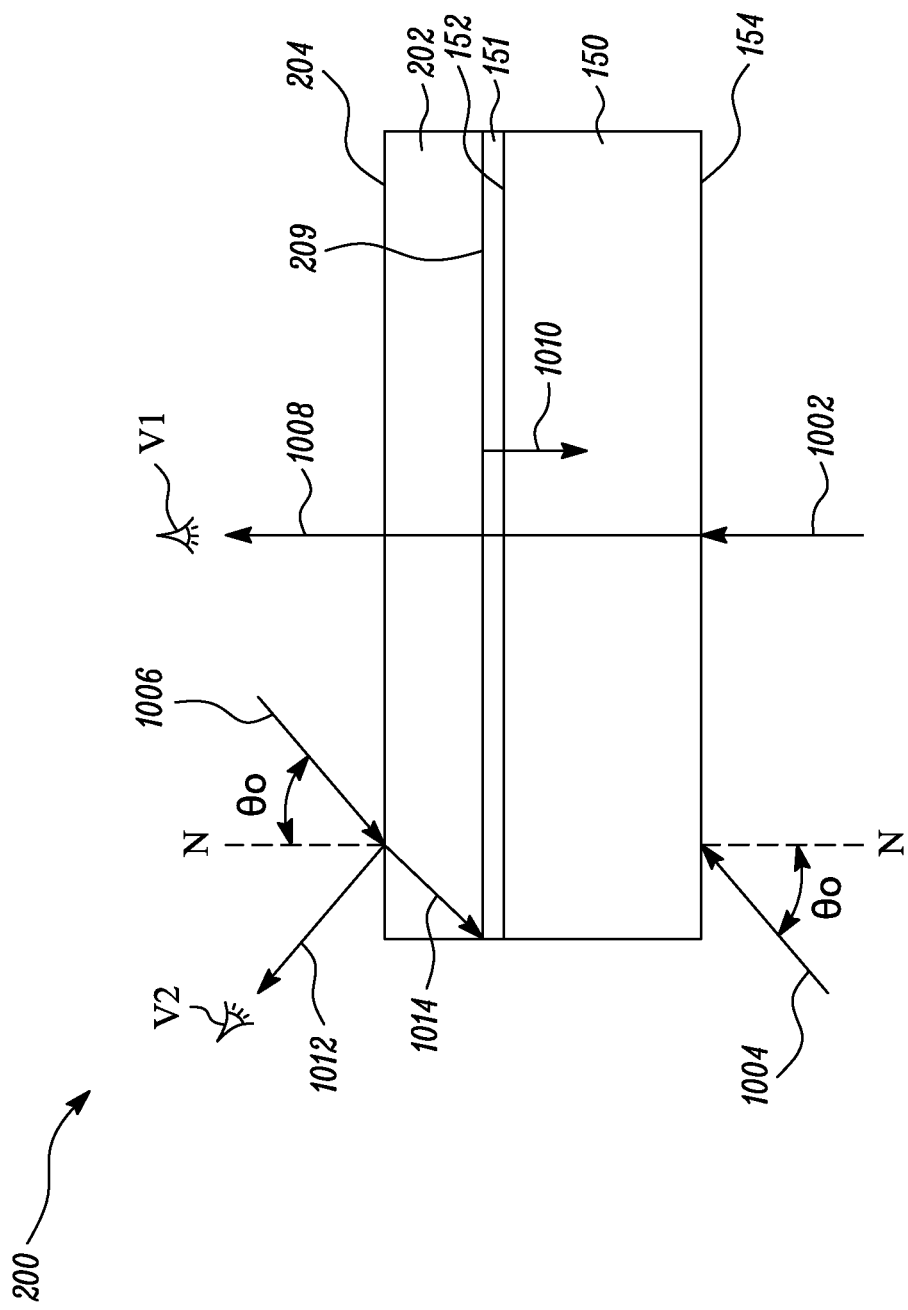
FIG. 10 illustrates a schematic view of an optical stack of the display system of FIG. 1, according to an embodiment of the present disclosure.

FIG. 10 illustrates a schematic view of the optical stack 200 including the optical film 202, the light control film 150, and the adhesive layer 151 disposed between the optical film 202 and the light control film 150. As shown in FIG. 10, a first light 1002 is substantially normally incident on the second major surface 154 of the light control film 150. A second light 1004 is obliquely incident on the second major surface 154 of the light control film 150 at the oblique angle θo greater than half of the viewing angle θv. A third light 1006 is obliquely incident on the first major surface 204 of the optical film 202 at the oblique angle θo greater than half of the viewing angle θv. An on-axis viewer V1 is viewing the optical stack 200 within the viewing angle θv. An off-axis viewer V2 is viewing the optical stack 200 outside the viewing angle θv.

The optical stack 200 may transmit at least a first portion of the first light 1002 as a first transmitted light 1008 towards the on-axis viewer V1 and reflect at least a second portion of the first light 1002 as a first reflected light 1010 away from the on-axis viewer V1. Specifically, the light control film 150 and the optical film 202 may together transmit the first portion of the first light 1002 as the first transmitted light 1008. Further, the optical film 202 may reflect at least the second portion of the first light 1002 as the first reflected light 1010. In some cases, the first light 1002 corresponds to the display light 10. The first transmitted light 1008 may substantially include wavelengths in the visible wavelength range. The first reflected light 1010 may substantially include UV wavelengths and low blue wavelengths. The optical stack 200 may therefore protect the on-axis viewer V1 from UV wavelengths and low blue wavelengths that may be present in the display light 10. Further, the on-axis viewer V1 can view contents of the display system 100 without substantial color shift.

The optical stack 200 may substantially block the second light 1004. Specifically, the light control film 150 may substantially absorb the second light 1004. Consequently, the off-axis viewer V2 may be unable to view contents of a display including the optical stack 200.

The optical stack 200 may reflect at least a first portion of the third light 1006 as a third reflected light 1012 towards the off-axis viewer V2 and transmit at least a second portion of the third light 1006 as a third transmitted light 1014 away from the off-axis viewer V2. Specifically, the optical film 202 may reflect the first portion of the third light 1006 as the third reflected light 1012. Further, optical film 202 may transmit at least the second portion of the third light 1006 as the third transmitted light 1014. In some cases, the third light 1006 corresponds to ambient light, such as sunlight. The third reflected light 1012 may substantially include wavelengths in the visible wavelength range, for example, green light, red light, etc. The third transmitted light 1014 may substantially include UV wavelengths and low blue wavelengths. The optical stack 200 may therefore protect the off-axis viewer V2 from UV wavelengths and low blue wavelengths that may be present in the third light 1006. Further, the off-axis viewer V2 can perceive visible light in a design wavelength range.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An optical stack comprising:
   a light control film comprising a plurality of visible light transmitting regions separated from each other by one or more visible light absorbing regions; and
   an optical film disposed on the light control film and comprising a plurality of microlayers having an F-ratio between about 0.25 to about 0.35, or about 0.65 to about 0.75, a primary reflection band having a first band edge between about 600 nanometers (nm) and about 700 nm, and a secondary reflection band having a second band edge between about 350 nm and about 460 nm, wherein the plurality of microlayers has an average optical reflectance of greater than about 80% across a full width at half maximum (FWHM) of the primary reflection band for each of mutually orthogonal first and second polarization states.

2. The optical stack of claim 1, wherein the optical film further comprises a transmission band between the primary and secondary reflection bands, the transmission band comprising the first band edge, the second band edge, and a FWHM extending from a first low wavelength to a first high wavelength greater than the first low wavelength, wherein the first low wavelength is disposed within a first wavelength range from about 420 nm to about 460 nm, and wherein the first high wavelength is disposed within a second wavelength range from about 620 nm to about 660 nm.

3. The optical stack of claim 2, wherein the plurality of microlayers has an average optical transmittance of about 80% across the FWHM of the transmission band for each of the first and second polarization states, wherein for a substantially normally incident light and for each of the first and second polarization states, the plurality of microlayers reflects at least about 60% of the light for at least one wavelength less than the first low wavelength of the FWHM of the transmission band, wherein the FWHM of the primary reflection band extends from a second low wavelength to a second high wavelength greater than the second low wavelength, wherein the second low wavelength is disposed within the second wavelength range from about 620 nm to about 660 nm, and wherein the second high wavelength is disposed within a third wavelength range from about 830 nm to about 880 nm, and wherein for a substantially normally incident light and for each of the first and second polarization states, the plurality of microlayers transmits at least about 60% of the light for at least one wavelength less than the second low wavelength of the FWHM of the primary reflection band, and greater than the first low wavelength of the FWHM of the transmission band, wherein the FWHM of the primary reflection band has a reflection bandwidth of at least about 150 nm.

4. An optical stack comprising:
a light control film comprising a first major surface, a second major surface opposite to the first major surface, and a plurality of alternating visible light transmitting regions and visible light absorbing regions disposed between the first major surface and the second major surface, wherein the light control film has a viewing angle of less than about 60 degrees; and
an optical film disposed on the first major surface of the light control film, the optical film comprising a transmission band comprising a first band edge, a second band edge, and a full width at half maximum (FWHM) extending from a first low wavelength to a first high wavelength greater than the first low wavelength, wherein the first low wavelength is disposed within a first wavelength range from about 420 nm to about 460 nm, and wherein the first high wavelength is disposed within a second wavelength range from about 620 nm to about 660 nm, such that:
for a substantially normally incident first light and for at least one polarization state, the optical film transmits at least about 60% of the first light for at least one first wavelength within the FWHM of the transmission band;
for the substantially normally incident first light and for the at least one polarization state, the optical film reflects at least about 60% of the first light for at least one second wavelength less than the at least one first wavelength of the transmission band;
for a second light incident at an oblique angle greater than about half of the viewing angle with respect to a normal to a major surface of the optical film and for the at least one polarization state, the optical film transmits at least about 60% of the second light for the at least one first wavelength; and
for the second light incident at the oblique angle greater than about half of the viewing angle with respect to the normal to the major surface of the optical film and for the at least one polarization state, the optical film transmits at least about 60% of the second light for the at least one second wavelength.

5. The optical stack of claim 4, wherein the optical film further comprises a reflection band adjacent to the transmission band, the reflection band comprising the first band edge, a third band edge, and a FWHM extending from a second low wavelength to a second high wavelength greater than the second low wavelength, wherein the second low wavelength is disposed within the second wavelength range from about 620 nm to about 660 nm, such that:
for the substantially normally incident first light and for the at least one polarization state, the optical film reflects at least about 60% of the first light for at least one third wavelength within the FWHM of the reflection band;
for the substantially normally incident first light and for the at least one polarization state, the optical film transmits at least about 60% of the first light for at least one fourth wavelength less than the second low wavelength and greater than the at least one first wavelength;
for the second light incident at the oblique angle greater than about half of the viewing angle with respect to the normal to the major surface of the optical film and for the at least one polarization state, the optical film reflects at least about 60% of the second light for the at least one third wavelength; and
for the second light incident at the oblique angle greater than about half of the viewing angle with respect to the normal to the major surface of the optical film and for the at least one polarization state, the optical film reflects at least about 60% of the second light for the at least one fourth wavelength.

6. The optical stack of claim 5, wherein the second high wavelength is disposed within a third wavelength range from about 830 nm to about 880 nm, such that:
for the substantially normally incident first light and for the at least one polarization state, the optical film transmits at least about 60% of the first light for at least one fifth wavelength greater the second high wavelength; and
for the second light incident at the oblique angle greater than about half of the viewing angle with respect to the normal to the major surface of the optical film and for the at least one polarization state, the optical film transmits at least about 60% of the second light for the at least one fifth wavelength.

7. The optical stack of claim 4, wherein the at least one first wavelength is greater than the first low wavelength by at most about 70% of the FWHM of the transmission band, wherein the at least one second wavelength is less than the first low wavelength by at most about 40% of the FWHM of the transmission band, wherein the at least one third wavelength is greater than the second low wavelength by at most about 50% of the FWHM of the reflection band, and wherein the at least one fourth wavelength is less than the second low wavelength by at most about 60% of the FWHM of the reflection band.

8. An optical film comprising:
a packet comprising a plurality of microlayers numbering at least 50 in total, each of the microlayers having an average thickness of less than about 350 nm, the packet comprising a transmission band comprising a first band edge, a second band edge, and a full width at half maximum (FWHM) extending from a first low wavelength to a first high wavelength greater than the first low wavelength, wherein the first low wavelength is disposed within a first wavelength range from about 420 nm to about 460 nm, and wherein the first high wavelength is disposed within a second wavelength range from about 620 nm to about 660 nm, such that:
for a substantially normally incident first light and for at least one polarization state, the packet transmits at least about 60% of the first light for at least one first wavelength within the FWHM of the transmission band;
for the substantially normally incident first light and for the at least one polarization state, the packet reflects at least about 60% of the first light for at least one second wavelength less than the at least one first wavelength of the transmission band;
for a second light incident at an oblique angle greater than about 30 degrees with respect to a normal to a major surface of the optical film and for the at least one polarization state, the packet transmits at least about 60% of the second light for the at least one first wavelength; and for the second light incident at the oblique angle greater than about 30 degrees with respect to the normal to the major surface of the optical film and for the at least one polarization state, the packet transmits at least about 60% of the second light for the at least one second wavelength.

9. The optical film of claim 8, wherein the packet further comprises a reflection band adjacent to the transmission band, the reflection band comprising the first band edge, a third band edge, and a FWHM extending from a second low wavelength to a second high wavelength greater than the second low wavelength, wherein the second low wavelength is disposed within the second wavelength range from about 620 nm to about 660 nm, such that:
  for the substantially normally incident first light and for the at least one polarization state, the packet reflects at least about 60% of the first light for at least one third wavelength within the FWHM of the reflection band;
  for the substantially normally incident first light and for the at least one polarization state, the packet transmits at least about 60% of the first light for at least one fourth wavelength less than the second low wavelength and greater than the at least one first wavelength;
  for the second light incident at the oblique angle greater than about 30 degrees with respect to the normal to the major surface of the optical film and for the at least one polarization state, the packet reflects at least about 60% of the second light for the at least one third wavelength; and
  for the second light incident at the oblique angle greater than about 30 degrees with respect to the normal to the major surface of the optical film and for the at least one polarization state, the packet reflects at least about 60% of the second light for the at least one fourth wavelength.

10. The optical film of claim 9, wherein the second high wavelength is disposed within a third wavelength range from about 830 nm to about 880 nm, such that:
  for the substantially normally incident first light and for the at least one polarization state, the packet transmits at least about 60% of the first light for at least one fifth wavelength greater the second high wavelength; and
  for the second light incident at the oblique angle greater than about 30 degrees with respect to the normal to the major surface of the optical film and for the at least one polarization state, the packet transmits at least about 60% of the second light for the at least one fifth wavelength, wherein the FWHM of the reflection band has a reflection bandwidth of at least about 150 nm, and wherein the FWHM of the transmission band has a transmission bandwidth of at least about 150 nm.

\* \* \* \* \*